(12) United States Patent
Vilkamo et al.

(10) Patent No.: US 11,523,241 B2
(45) Date of Patent: Dec. 6, 2022

(54) SPATIAL AUDIO PROCESSING

(71) Applicant: Nokia Technologies Oy, Espoo (FI)

(72) Inventors: Juha Vilkamo, Helsinki (FI); Mikko-Ville Laitinen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/270,530

(22) PCT Filed: Aug. 2, 2019

(86) PCT No.: PCT/FI2019/050575
§ 371 (c)(1),
(2) Date: Feb. 23, 2021

(87) PCT Pub. No.: WO2020/039119
PCT Pub. Date: Feb. 27, 2020

(65) Prior Publication Data
US 2021/0337338 A1    Oct. 28, 2021

(30) Foreign Application Priority Data

Aug. 24, 2018 (GB) ...................................... 1813846

(51) Int. Cl.
*H04S 7/00* (2006.01)
*G10L 19/008* (2013.01)

(52) U.S. Cl.
CPC ............ *H04S 7/302* (2013.01); *G10L 19/008* (2013.01); *H04S 2400/01* (2013.01); *H04S 2400/11* (2013.01); *H04S 2420/01* (2013.01)

(58) Field of Classification Search
CPC .. H04S 7/302; H04S 2400/01; H04S 2400/11; H04S 2420/01; G10L 19/008
(Continued)

(56) References Cited

U.S. PATENT DOCUMENTS

2002/0150254 A1   10/2002  Wilcock et al.
2008/0159559 A1    7/2008  Akagi et al.
(Continued)

FOREIGN PATENT DOCUMENTS

WO   WO-2013/093187 A2   6/2013
WO   WO 2017/178309 A1  10/2017

OTHER PUBLICATIONS

Schultz-Amling et al. ("Acoustical Zooming Based on a Parametric Sound Field Representation," Audio Engineering Society, 128th Convention, London, UK, Paper 8120, May 22-25, 2010, pp. 1-9) (Year: 2010).*

(Continued)

*Primary Examiner* — Paul Kim
(74) *Attorney, Agent, or Firm* — Harrington & Smith

(57) ABSTRACT

According to an example embodiment, a method for processing a spatial audio signal that represents an audio scene, wherein the spatial audio signal is controllable and associated with at least two viewing directions is provided, the method including receiving a focus direction and a focus amount; processing the spatial audio signal by modifying the audio scene so as to control emphasis in, at least in part, a portion of the spatial audio signal in said focus direction according to said focus amount; and outputting the processed spatial audio signal, wherein the modified audio scene enables the emphasis in, at least in part, said portion of the spatial audio signal in said focus direction according to said focus amount.

20 Claims, 8 Drawing Sheets

(58) Field of Classification Search
USPC .......................................................... 381/17
See application file for complete search history.

(56) References Cited

U.S. PATENT DOCUMENTS

| | | |
|---|---|---|
| 2009/0116652 A1 | 5/2009 | Kirkeby et al. |
| 2010/0040238 A1 | 2/2010 | Jang et al. |
| 2012/0076304 A1 | 3/2012 | Suzuki |
| 2014/0185823 A1 | 7/2014 | Seligmann et al. |
| 2015/0055808 A1 | 2/2015 | Vennstrom et al. |
| 2016/0132289 A1 | 5/2016 | Vennstrom et al. |
| 2016/0134987 A1 | 5/2016 | Gorzel et al. |

OTHER PUBLICATIONS

Pulkki, Ville, "Spatial Sound Reproduction with Directional Audio Coding", Jun. 2007, AES, abstract only, 1 pg.
Deng, Shujie, et al., "Understanding the impact of multimodal interaction using gaze informed mid-air gesture control in 3D virtual objects manipulation", Apr. 27, 2017, International Journal of Human-computer Studies, abstract only, 1 pg.
Delikaris-Manias, s. et al., "Signal-Dependent Spatial Filtering Based on Weighted-Orthogonal Beamformers in the Spherical Harmonic Domain", Apr. 28, 2016, IEEE/ACM Transactions on Audio, speech and Language Processing, abstract only, 1 pg.
Schultz-Amling, et al., "Acoustical Zooming Based on a Parametric Sound Field Representation", May 1, 2010, Audio Engineering Society, abstract only, 1 pg.
Pulkki, Ville, "Virtual Sound Source Positioning Using Vector Base Amplitude Panning", AES, Jun. 1, 1997, abstract only, 2 pgs.

* cited by examiner

200

Receive an indication of a focus direction
202

↓

Receive an indication of a focus strength
204

↓

Process an input spatial audio signal into an intermediate spatial audio signal that represents a modified audio scene where relative sound level of sound arriving from said focus direction is modified in accordance with said focus strength
206

↓

Receive reproduction control information
208

↓

Process the intermdiate spatial audio signal into an output spatial audio signal in accordance with said reproduction control information
210

Figure 2

SPATIAL AUDIO PROCESSING

CROSS REFERENCE TO RELATED APPLICATION

This patent application is a U.S. National Stage application of International Patent Application Number PCT/FI2019/050575 filed Aug. 2, 2019, which is hereby incorporated by reference in its entirety, and claims priority to GB 1813846.1 filed Aug. 24, 2018.

TECHNICAL FIELD

The example and non-limiting embodiments of the present invention relate to processing of spatial audio signals. In particular, various embodiments of the present invention relate to controlling playback of spatial audio signals that represent a spatial audio image, i.e. an audio scene that involves one or more directional sound components possibly together with an ambient sound component.

BACKGROUND

Multi-view video or video with multiple viewing directions enables substantially wider viewing angle to a scene than traditional video. Typically, such video content provides viewing angle that is wider than that accommodated by a traditional 'flat' screen and hence in playback of such a video a user is provided with a mechanism to pan the multi-view video in order to select a sub-portion (or a sector) of interest from the available overall viewing angle. Hence, the panning results in the user selecting a viewing direction that covers a sub-portion of the overall viewing angle enabled by the video content. Probably the most typical example of a multi-view video is 360-degree video (also known as immersive video or spherical video) that provides a view to all directions around a point of capture.

Non-limiting examples of arrangements that enable a user to view a multi-view video include the following:
- a head-mounted display or a mobile device (such as a mobile phone) arranged in a head-mount provided with tracking of user orientation for selecting of the viewing direction;
- a display of a mobile device (such as a mobile phone), where the desired viewing direction is selectable e.g. by changing the position and/or orientation of the mobile device, by using hand and/or arm gestures;
- a display of a traditional computing device (such a laptop or desktop computer or a mobile phone), where the desired viewing direction is selectable by a suitable user-interface mechanism;
- an arrangement of displays around a viewing point.

The multi-view video is in many scenarios provided with audio associated with the scene depicted in the multi-view video. The associated audio is preferably provided as spatial audio and it is rendered to the user such that spatial characteristics of the spatial audio image follow the viewing angle selected for the multi-view video, in other words listening direction to the audio scene follows the selected viewing direction. Spatial audio may be provided as a spatial audio signal. Spatial audio may be also provided independently of a video content. If, in such a scenario, employed audio rendering arrangement allows for user-selection of a listening orientation (e.g. a listening direction or a 'viewing direction') with respect to the audio scene represented by a spatial audio signal, this may be referred to as multi-view audio.

A spatial audio signal is provided using a suitable spatial audio format that is able to convey an audio scene that involves both directional sound sources at specific positions of the audio scene as well as the ambience of the audio scene. In this regard, a spatial audio signal may comprise information that defines one or more directional sound components that represent distinct sound sources that have certain position within the audio scene (e.g. a certain direction of arrival and a certain relative intensity with respect to a listening point) and information that defines an ambient sound component that defines environmental sounds within the audio scene. Listening to such an audio scene enables the listener to experience the audio environment as if he or she was at the location the audio scene serves to represent. The audio scene may also be referred to as a spatial audio image.

Several spatial audio formats are known in the art. Non-limiting examples in this regard include the following:
- Ambisonic signal (of any order) comprising audio signal components that provide a spherical harmonic decomposition of a sound field in a point in space. These audio signal components may be referred to as spherical harmonics and they can be considered as a set of spatially selective beam signals. Ambisonics is utilized currently, for example, in YouTube 360 VR video service. An advantage of Ambisonics as a spatial audio format is that it provides a relatively straightforward and well-defined representation of a spatial audio signal.
- Surround loudspeaker signal according to a predefined loudspeaker configuration (or loudspeaker setup) to provide surround sound. Examples of loudspeaker configurations to provide surround sound in various applications include 5.1, 7.1 10.2 and 22.2 channel configurations. Presently the spatial audio of typical movies is conveyed as surround loudspeaker signals. Advantages of using a surround loudspeaker as a spatial audio format includes simplicity and legacy compatibility.
- Audio formats similar to a surround loudspeaker signal format that serve to provide audio objects instead of using audio channels according to a predefined loudspeaker configuration. The audio objects represented by (audio signals or 'channels') by such audio formats may be considered as audio channels with a time-variant position.
- Parametric spatial audio, such as a two-channel audio signal and associated spatial metadata in perceptually relevant frequency bands, where the spatial metadata defines spatial characteristics of the audio at respective frequency sub-bands. Such a representation of spatial audio is applied by state-of-the-art audio coding methods and spatial audio capture methods. The spatial metadata essentially determines how the audio signals should be spatially reproduced at the receiver end (e.g. to which directions at different frequencies). Advantages of parametric spatial audio include its versatility, sound quality, and ability to employ low bit rates for encoding the spatial audio signal.

A spatial audio signal may be obtained by using a microphone arrangement that includes a plurality of microphones to capture a respective plurality of audio signals and processing the audio signals into a desired spatial audio format that represents the audio scene. The spatial audio signal may be captured together with the multi-view video it is associated with. Non-limiting examples in this regard include a microphone array mounted on a Nokia OZO camera, on a virtual reality (VR) camera of other type, or on a hand-held mobile device (such as a mobile phone). As another example, a spatial audio signal may be created on basis of one or more arbitrary source signals by processing them, e.g. in a recording studio, into a desired spatial audio format that represents the audio scene of desired characteristics (e.g. with respect to directionality of sound sources and ambience of the audio scene). As a further example, a combination of a captured audio scene and an artificially generated audio scene may be provided e.g. by complementing a spatial audio signal captured by a microphone array via introduction of one or more (further) directional sound sources at desired spatial positions of the audio scene and/or by a commentator track.

In context of spatial audio associated with multi-view video or in context of stand-alone multi-view audio, the audio scene may involve a high number of directional sound sources together with relatively high-level environmental sounds and hence novel mechanism that enable concentrating on a certain part of the audio scene and/or efficiently browsing in the audio scene can be considered highly useful.

SUMMARY

According to an example embodiment, a method for processing a spatial audio signal that represents an audio scene, wherein the spatial audio signal is controllable and associated with at least two viewing directions is provided, the method comprising: receiving a focus direction and a focus amount; processing the spatial audio signal by modifying the audio scene so as to control emphasis in, at least in part, a portion of the spatial audio signal in said focus direction according to said focus amount; and outputting the processed spatial audio signal, wherein the modified audio scene enables the emphasis in, at least in part, said portion of the spatial audio signal in said focus direction according to said focus amount.

According to another example embodiment, an apparatus for processing a spatial audio signal that represents an audio scene, wherein the spatial audio signal is controllable and associated with at least two viewing directions is provided, the apparatus configured to: receive a focus direction and a focus amount; process the spatial audio signal by modifying the audio scene so as to control emphasis in, at least in part, a portion of the spatial audio signal in said focus direction according to said focus amount; and output the processed spatial audio signal, wherein the modified audio scene enables the emphasis in, at least in part, said portion of the spatial audio signal in said focus direction according to said focus amount.

According to another example embodiment, an apparatus for processing a spatial audio signal that represents an audio scene, wherein the spatial audio signal is controllable and associated with at least two viewing directions is provided, the apparatus comprising: means for receiving a focus direction and a focus amount; means for processing the spatial audio signal by modifying the audio scene so as to control emphasis in, at least in part, a portion of the spatial audio signal in said focus direction according to said focus amount; and means outputting the processed spatial audio signal, wherein the modified audio scene enables the emphasis in, at least in part, said portion of the spatial audio signal in said focus direction according to said focus amount.

According to another example embodiment, an apparatus for processing a spatial audio signal that represents an audio scene, wherein the spatial audio signal is controllable and associated with at least two viewing directions is provided, wherein the apparatus comprises at least one processor; and at least one memory including computer program code, which when executed by the at least one processor, causes the apparatus to: receive a focus direction and a focus amount; process the spatial audio signal by modifying the audio scene so as to control emphasis in, at least in part, a portion of the spatial audio signal in said focus direction according to said focus amount; and output the processed spatial audio signal, wherein the modified audio scene enables the emphasis in, at least in part, said portion of the spatial audio signal in said focus direction according to said focus amount.

According to another example embodiment, a computer program for processing a spatial audio signal that represents an audio scene, wherein the spatial audio signal is controllable and associated with at least two viewing directions is provided, the computer program comprising computer readable program code configured to cause performing at least a method according to the example embodiment described in the foregoing when said program code is executed on a computing apparatus.

The computer program according to an example embodiment may be embodied on a volatile or a non-volatile computer-readable record medium, for example as a computer program product comprising at least one computer readable non-transitory medium having program code stored thereon, the program which when executed by an apparatus cause the apparatus at least to perform the operations described hereinbefore for the computer program according to an example embodiment of the invention.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where

FIG. 2 illustrates a flowchart depicting a method for spatial audio processing according to an example;

DESCRIPTION OF SOME EMBODIMENTS

Figure 1:
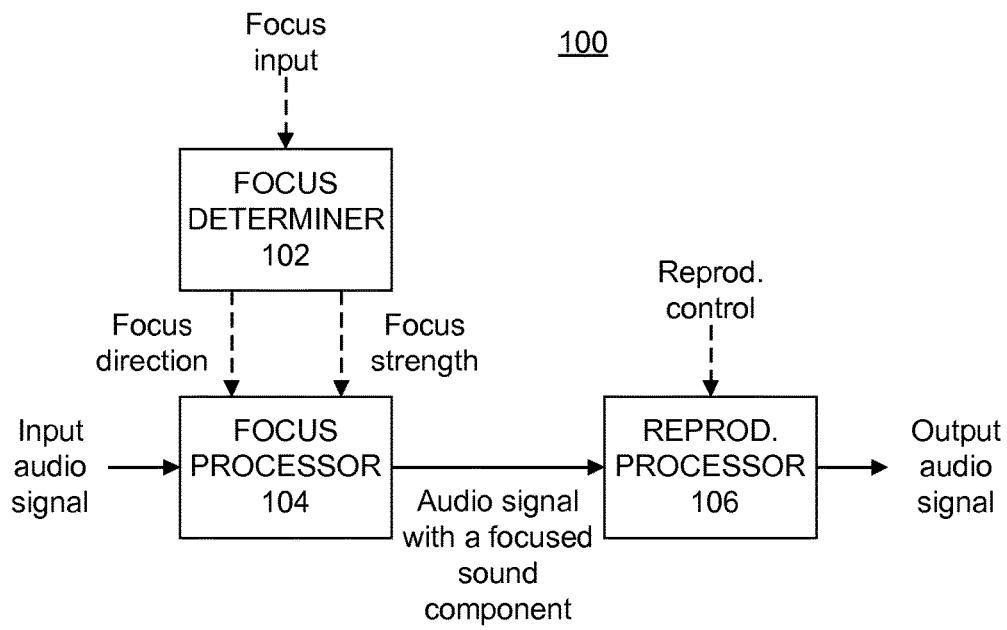
FIG. 1 illustrates a block diagram of some elements of a spatial audio processing arrangement according to an example.

The present disclosure pertains to a technique for processing and outputting a spatial audio signal that represents an audio scene in accordance with a focus direction and focus amount defined based on user input, possibly further in accordance with a reproduction orientation (e.g. a listening direction) defined on basis of user input. As an example in this regard, a method for processing a spatial audio signal may be provided, wherein the spatial audio signal is associated with at least two viewing directions and the reproduction of the spatial audio signal is controllable at least via respective indication of the focus direction and the focus amount and possibly further via an indication of the reproduction orientation. In particular, at least two different viewing directions may be defined for the spatial audio signal and the indicated reproduction orientation may be applied to select one of the one or two viewing directions. The method may comprise receiving a focus direction and a focus amount, processing the spatial audio signal by modifying the audio scene so as to control emphasis at least in part a portion of the spatial audio signal in the received focus direction according to the received focus amount, and outputting the processed spatial audio signal, wherein the modified audio scene enables the emphasis at least in part said portion of the spatial audio signal in the received focus direction according to the received focus amount.

In the method described above, the focus direction and focus amount may be applied to emphasize a portion of the spatial audio signal such that the portion of the spatial audio signal to be emphasized is defined via the focus direction and the strength of the emphasis is defined via the focus amount. As an example, the strength of the emphasis may be defined as a function of the focus amount. The emphasis may concern the portion (e.g. a direction) of the spatial audio signal in its entirety or only part thereof. In the latter scenario, the emphasis may concern, for example, only a sound component that represents a directional sound source in the portion of the audio scene defined via the focus direction or a sound component that represents an ambient sound component in the portion of the audio scene defined via the focus direction.

As an example, in the method outlined in the foregoing, the aspect of processing the spatial audio signal may comprise increasing the sound level at least in said portion of the spatial audio signal in the received focus direction according to the received focus amount. In another example, in the method outlined in the foregoing, the aspect of processing the spatial audio signal may comprise decreasing the sound level at least in said portion of the spatial audio signal in directions other than the received focus direction according to the received focus amount. In a further example, the aspect of processing the spatial audio signal may comprise increasing the sound level at least in said portion of the spatial audio signal in the received focus direction and decreasing the sound level at least in said portion of the spatial audio signal in directions other than the received focus direction according to the received focus amount.

Instead of providing the disclosed spatial audio processing technique as a method as described in the foregoing, the spatial audio processing technique disclosed herein may be provided, for example, as an apparatus comprising respective means for implementing the steps of the method described in the foregoing, as an apparatus comprising at least one processor; and at least one memory including computer program code, which when executed by the at least one processor, causes the apparatus to implement the steps of the method described in the foregoing, or as a computer program configured to cause performing the steps of the method described in the foregoing when said program code is executed on a computing apparatus In the following, a plurality of examples for providing the technique for processing and outputting a spatial audio signal described above are provided.

FIG. 1 illustrates a block diagram of some components and/or entities of a spatial audio processing arrangement 100 according to an example. The spatial audio processing arrangement 100 comprises an audio focus determiner 102 for deriving focus direction and focus strength at least in part in dependence of focus input, an audio focus processor 104 for deriving an audio signal with a focused sound component on basis of an input audio signal in dependence of the focus direction and the focus strength (or focus amount), and an audio reproduction processor 106 for deriving an output audio signal in a predefined audio format on basis of the audio signal with a focused sound component in dependence of reproduction control information that serves to control at least one aspect pertaining to processing of the spatial audio signal with a focused component in the audio reproduction processor 106. The reproduction control information may comprise an indication of a reproduction orientation (or a reproduction direction) and/or an indication of an applicable loudspeaker configuration. In consideration of the method for processing a spatial audio signal described above, the audio focus processor 104 may be arranged to implement the aspect of processing the spatial audio signal by modifying the audio scene so as to control emphasis at least in a portion of the spatial audio signal in the received focus direction according to the received focus amount, whereas the audio reproduction processor 106 may be arranged to implement the aspect of outputting the processed spatial audio signal, wherein the modified audio scene enables the emphasis at least in said portion of the spatial audio signal in the received focus direction according to the received focus amount.

In the illustration of FIG. 1, each of the input audio signal, the audio signal with a focused sound component and the output audio signal is provided as a respective spatial audio signal in a predefined spatial audio format. Hence, these signals may be referred to as an input spatial audio signal, a spatial audio signal with a focused sound component and an output spatial audio signal, respectively. Along the lines described in the foregoing, typically a spatial audio signal conveys an audio scene that involves both one or more directional sound sources at respective specific positions of the audio scene as well as the ambience of the audio scene. In some scenarios, though, a spatial audio scene may involve one or more directional sound sources without the ambience or the ambience without any directional sound sources. In this regard, a spatial audio signal comprises information that conveys one or more directional sound components that represent distinct sound sources that have certain position within the audio scene (e.g. a certain direction of arrival and a certain relative intensity with respect to a listening point) and/or an ambient sound component that represents environmental sounds within the audio scene. It should be noted that this division to the directional sound component(s) and to the ambient component is a conceptual one and the same pieces of information (e.g. audio channels of a spatial audio signal) may convey both information that represents one or more directional sound components and information that represents the ambient audio component.

Typically, the input audio signal and the audio signal with a focused sound component are provided in the same predefined spatial format, whereas the output audio signal may be provided in the same spatial format as applied for the input audio signal (and the audio signal with a focused sound component) or a different predefined spatial audio format may be employed for the output audio signal. The spatial audio format of the output audio signal is selected in view of the characteristics of the sound reproduction hardware applied for playback for the output audio signal. In general, the input audio signal may be provided in a first predetermined spatial audio format and the output audio signal may be provided in a second predetermined spatial audio format. Non-limiting examples of spatial audio formats suitable for use as the first and/or second spatial audio format include Ambisonics, surround loudspeaker signals according to a predefined loudspeaker configuration, a predefined parametric spatial audio format. More detailed non-limiting examples of usage of these spatial audio formats in the framework of the spatial audio processing arrangement 100 as the first and/or second spatial audio format are provided later in this disclosure.

The spatial audio processing arrangement 100 is typically applied to process the input spatial audio signal as a sequence of input frames into a respective sequence of output frames, each input (output) frame including a respective segment of digital audio signal for each channel of the input (output) spatial audio signal, provided as a respective time series of input (output) samples at a predefined sampling frequency. In typical example, the spatial audio processing arrangement 100 employs a fixed predefined frame length such that each frame comprises respective L samples for each channel of the input spatial audio signal, which at the predefined sampling frequency maps to a corresponding duration in time. As an example in this regard, the fixed frame length may be 20 milliseconds (ms), which at a sampling frequency of 8, 16, 32 or 48 kHz results in a frame of L=160, L=320, L=640 and L=960 samples per channel, respectively. The frames may be non-overlapping or they may be partially overlapping.

These values, however, serve as non-limiting examples and frame lengths and/or sampling frequencies different from these examples may be employed instead, depending e.g. on the desired audio bandwidth, on desired framing delay and/or on available processing capacity.

In the spatial audio processing arrangement 100, the focus direction refers to a user-selectable spatial direction of interest. The focus direction may be, for example, a certain direction of the audio scene in general. In another example, the focus direction or a direction in which a (directional) sound source of interest is currently positioned. In the former scenario, the user-selectable focus direction typically denotes a spatial direction that stays constant or changes infrequently since the focus is predominantly in a specific spatial direction, whereas in the latter scenario the user-selected focus direction may change more frequently since the focus is set to a certain sound source that may (or may not) change its position in the audio scene over time. In an example, the focus direction may be defined, for example, as an azimuth angle that defines the spatial direction of interest with respect to a first predefined reference direction and/or as an elevation angle that defines the spatial direction of interest with respect to a second predefined reference direction.

The focus strength (or focus amount) refers to a user-selectable change in relative sound level of sound arriving from the focus direction. The focus strength may be also referred to as focus amount and these terms are interchangeably used in this disclosure. The focus strength may be selectable between zero (i.e. no focus) and a predefined maximum strength. The focus strength may be applied by mapping the user-selected focus strength into a scaling factor in a range from 0 to 1 and modifying the sound level of the sounds arriving from the focus direction (in relation to sounds arriving from other directions) in accordance with the scaling factor.

In an example, the focus determiner 102 is arranged to derive both the focus direction and the focus strength on basis of the focus input provided thereto. In another example, the focus determiner 102 is arranged to derive only the focus direction on basis of the focus input provided thereto, whereas a predefined focus strength is applied. In the latter example, the predefined focus strength may comprise a predefined amplification of sounds arriving from the focus direction (e.g. via usage of a scaling factor that is predefined value larger than zero). More detailed non-limiting examples of operation of the audio focus determiner 102 with respect to deriving the focus direction and focus strength (where applicable) are described later in this disclosure.

The audio focus processor 104 is arranged to process the input spatial audio signal into the spatial audio signal with a focused sound component in dependence of the focus direction and the focus strength obtained from the audio focus determiner 102. In this regard, the audio focus processor 104 may process the input spatial audio signal such that the relative intensity of a sound component arriving from the focus direction is modified in accordance with the focus strength. This may be referred to as focus processing. In the following, the spatial audio signal with a focused sound component is predominantly referred to as an intermediate spatial audio signal. Both the input spatial audio signal and the intermediate spatial audio signal are preferably provided in the first predetermined spatial audio format.

The input spatial audio signal conveys an original audio scene, which preferably remains the same in the intermediate spatial audio signal apart from the focus processing applied to the sound component arriving from the focus direction. The input spatial audio signal and the intermediate spatial audio signal may be considered to represent a nominal listening direction or a nominal orientation with respect to the audio scene. The audio reproduction processor 106 is arranged to process the intermediate spatial audio signal (i.e. the audio signal with a focused sound component illustrated in FIG. 1) into an spatial output audio signal in accordance with the reproduction control information received therein.

Along the lines described in the foregoing, in an example the reproduction control information provided as input to the audio reproduction processor 106 may comprise an indication of a reproduction orientation with respect to the audio scene represented by the input spatial audio signal, where other examples the reproduction control information comprises, additionally or alternatively, an indication of an applicable loudspeaker configuration. In an example, the reproduction orientation indication comprises an indication of an absolute listening direction with respect to a reference direction (or reference orientation). The reference direction may be e.g. the nominal listening direction (or the nominal orientation) applied in the input spatial audio signal or any (other) predefined reference direction. In another example, the reproduction orientation indication comprises an indication of change in listening direction.

The reproduction orientation may be defined in a similar manner is the focus direction: in an example making use of an indication of the absolute listening direction, the reproduction orientation may be defined as an azimuth angle and/or an elevation angle with respect to a respective predefined reference orientation (e.g. the nominal listening direction defined for the input spatial audio signal), whereas in an example making use of an indication of a change in listening direction, the reproduction orientation may be defined as a change in the azimuth angle and/or a change in the elevation angle. As in case of the focus direction, also the reproduction orientation may be freely selectable or it may be selectable from a set of predefined reproduction orientations.

The reproduction orientation indication is derived on basis of user input, which may comprise a direct user input via a user interface of an apparatus implementing the spatial audio processing arrangement 100 or an user interface of a (first) apparatus communicatively coupled to a (second) apparatus implementing the spatial audio processing arrangement 100. In such scenarios the applied user interface may be a graphical user interface (GUI) of a laptop or desktop computer, a GUI of a tablet computer, a GUI of a mobile phone, etc.

In other examples, the direction indication may be received from a tracking device that is arranged to track position and/or orientation of the user in general or e.g. position and/or orientation of the user's head. As an example in this regard, such a tracking device may comprise a user-wearable device such as a head-mounted display device provided with orientation/position tracking or a dedicated user-wearable head tracking device arranged e.g. in headphones or in a headset. In another example, a device positioned in the environment of the user may serve a device that is arranged to track the orientation of the user or the orientation of the user's head. In a further example, a general purpose computing device such as a mobile phone or a tablet computer provided with orientation/position tracking may be applied to extract information that defines the orientation of the user with respect to the audio scene e.g. such that the user select the reproduction orientation by changing the position and/or orientation of the computing device accordingly. This may be provided e.g. by the user holding the computing device in his/her hand and moving the mobile device accordingly or by arranging a mobile device such as a mobile phone into a head-mount to use the mobile device to provide a head-mounted display assembly that enables tracking orientation of the user's head.

The audio reproduction processor 106 may rotate the audio scene from the nominal listening direction (or the nominal orientation) such that the reproduction orientation indicated via the reproduction control information becomes the front direction while spatial positions of directional sound components of the audio scene are repositioned accordingly to maintain their relative spatial positions with respect to each other. This may be referred to as rotation of the audio scene (or as a rotation procedure) and the outcome of the rotation procedure may be referred to as a rotated spatial audio signal. Techniques for such rotation of the audio scene are known in the art for various spatial audio formats and the audio reproduction processor 106 may be arranged to apply a technique suitable for rotating the intermediate spatial audio signal provided in the first predetermined spatial audio format.

The audio reproduction processor 106 may further convert the rotated spatial audio signal that is still provided in the first predetermined spatial audio format into the output spatial audio signal in the second predetermined spatial audio format, in other words into the spatial audio format applied by the sound reproduction hardware that may be coupled to the spatial audio processing arrangement 100 or that is the target system for playing back the output spatial audio signal. Techniques for such spatial audio format conversion are known in the art for a plurality of pairs of known spatial audio formats and any suitable technique in this regard may be applied in dependence of the spatial audio formats applied as the first and second predetermined spatial audio formats. However, a plurality of detailed non-limiting examples of operation of the audio reproduction processor 106 with respect to spatial audio format conversion from the first predetermined spatial audio format into the second predetermined spatial audio format are provided later in this disclosure.

It is worth noting that rotation of the audio scene is applied only in some scenarios, whereas in some other scenarios the audio reproduction processor 106 may omit the rotation of the audio scene and converts intermediate spatial audio signal from the first predetermined spatial audio format to the second predetermined spatial audio format applied for the output spatial audio signal. An example of the former type of scenarios is two-channel binaural playback via headphones, and an example of the latter type of scenarios is multi-channel playback using a predefined loudspeaker configuration.

The functionality described in the foregoing with references to components of the spatial audio processing arrangement 100 may be provided, for example, in accordance with a method 200 illustrated by a flowchart depicted in FIG. 2. The method 200 may be provided e.g. by an apparatus arranged implement the spatial audio processing system 100 described in the present disclosure via a number of examples. The method 200 serves as a method for processing an input spatial audio signal that represents an audio scene into an output spatial audio signal that represents a modified audio scene. The method 200 comprises receiving an indication of a focus direction and an indication of a focus strength, as indicated in blocks 202 and 204, respectively. The method 200 further comprises processing the input spatial audio signal into an intermediate spatial audio signal that represents the modified audio scene where relative level of sound arriving from said focus direction is modified according to said focus strength, as indicated in block 206. The method 200 further comprises receiving reproduction control information that controls processing of the intermediate spatial signal into the output spatial audio signal, as indicated in block 208. The reproduction control information may define, for example, at least one of a reproduction orientation (e.g. a listening direction or a viewing direction)

and a loudspeaker configuration for the output spatial audio signal. The method 200 further comprises processing the intermediate spatial audio signal into the output spatial audio signal in accordance with said reproduction control information, as indicated in block 210.

The method 200 may be varied in a plurality of ways, for example in accordance with examples pertaining to respective functionality of components of the spatial audio processing arrangement 100 provided in the foregoing and in the following.

Figure 3:
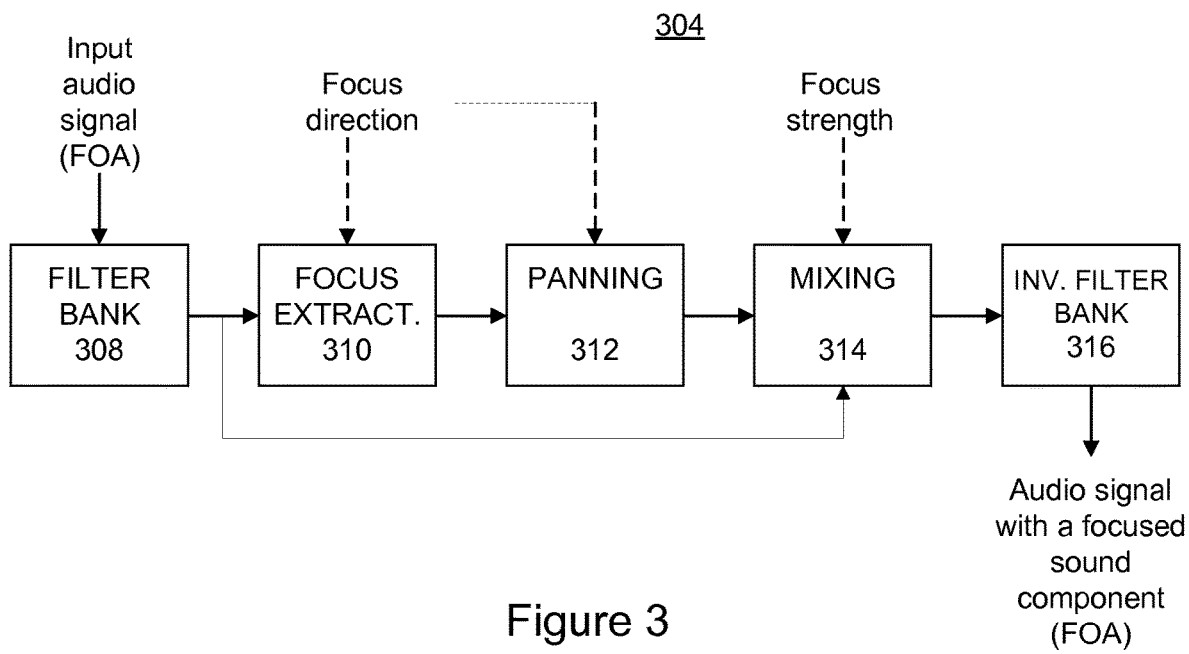
FIG. 3 illustrates a block diagram of some elements of an audio focus processor according to an example.

FIG. 3 illustrates a block diagram of some components and/or entities of an audio focus processor 304 according to an example. The audio focus processor 304 may be employed as the audio focus processor 104 in the framework of the spatial audio processing arrangement 100. The audio focus processor 304 comprises a filter bank 308 for transforming the input spatial audio signal from time domain into a transform domain, a focus extractor 310 for extracting a target audio signal that represents the sound arriving from the focus direction, an audio panner 312 for generating a focused spatial audio signal where the target audio signal is arranged in its original spatial position of the audio scene, an audio mixer 314 for combining the focused spatial audio signal (that includes the sound arriving from the focus direction only) with the input spatial audio signal in accordance with the focus strength to generate the intermediate spatial audio signal, and an inverse filter bank 316 for transforming the intermediate spatial audio signal from the transform domain back to the time domain.

In the audio focus processor 304, the input spatial audio signal and the intermediate spatial audio signal (labelled as the audio signal with a focused sound component in the illustration of FIG. 3) are provided as respective Ambisonic audio signals. In an example, the input audio signal to the audio focus processor 304 comprises a first-order Ambisonic (FOA) signal that includes four signals: an omnidirectional channel w and three orthogonal first-order channels (or patterns) along y, z and x coordinate axes, respectively. The coordinate order y, z, x is applied herein because it is the same order as the 1st order coefficients of the typical Ambisonic Channel Number (ACN) channel ordering in Ambisonic signals. Since Ambisonics represents an audio scene in terms of spatial beam patterns, the following examples that refer to Ambisonic FOA channels (or signals) readily generalize into any spatial audio format that represents spatial audio using a corresponding set of spatial beam patterns. Moreover, the following examples that refer to Ambisonic FOA channels (or signals) further generalize into a higher order Ambisonic (HOA) signals, such as $2^{nd}$ order Ambisonics with 9 channels or $3^{rd}$ order Ambisonics with 16 channels, mutatis mutandis.

The filter bank 308 is arranged to transform each channel of each frame of the FOA signal (that represents the input spatial audio signal) from the time domain to a transform domain. Without losing generality, the transform domain may be considered as a frequency domain and the transform-domain samples resulting from the transform may be referred to as frequency bins. The filter bank employs a predetermined transform technique known in the art. In an example, the filter bank employs short-time discrete Fourier transform (STFT) to convert each channel of the FOA signal into a respective channel of the transform-domain signal using a predefined analysis window length (e.g. 20 milliseconds). In another example, the filter bank 308 employs complex-modulated quadrature-mirror filter (QMF) bank for time-to-frequency-domain conversion. The STFT and QMF bank serve as non-limiting examples in this regard and in further examples any suitable technique known in the art may be employed for creating the transform-domain signals. The inverse filter bank 316 is arranged to transform each frame of the intermediate spatial audio signal (obtained from the audio mixer 314) from the transform domain back to the time domain for provision to the audio reproduction processor 106. The inverse filter bank 316 employs an inverse transform matching the transform applied by the filter bank 308, e.g. an inverse STFT or inverse QMF. The filter bank 308 and the inverse filter bank 316 are typically arranged to process each channel of the FOA signal separately from the other channels.

The filter bank 308 may further divide each of the FOA channels into a plurality of frequency sub-bands, thereby resulting in the transform-domain FOA signal that provides a respective time-frequency representation for each channel of the input spatial audio signal. A given frequency band in a given frame may be referred to as a time-frequency tile, and the processing of the spatial audio signal between the filter bank 308 and the inverse filter bank 316 is typically carried out separately for each time-frequency tile in the transform domain. The number of frequency sub-bands and respective bandwidths of the frequency sub-bands may be selected e.g. in accordance with the desired frequency resolution and/or available computing power. In an example, the sub-band structure involves 24 frequency sub-bands according to the Bark scale, an equivalent rectangular band (ERB) scale or $3^{rd}$ octave band scale known in the art. In other examples, different number of frequency sub-bands that have the same or different bandwidths may be employed. A specific example in this regard is a single frequency sub-band that covers the input spectrum in its entirety or a continuous subset thereof. Another specific example is consideration of each frequency bin as a separate frequency sub-band.

Figure 4:
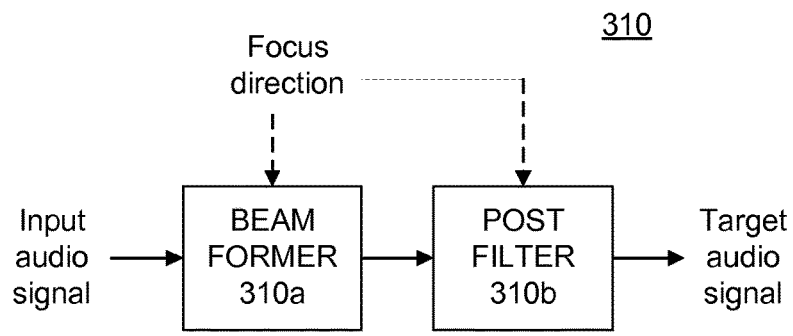
FIG. 4 illustrates a block diagram of some elements of a focus extractor according to an example.

The time-frequency tiles that represent the transform-domain input FOA signal (that represents the input spatial audio signal) are provided to the focus extractor 310 that is arranged to extract the target audio signal that represents the sound component arriving from the focus direction from the input spatial audio signal. The target audio signal is typically a monoaural (single-channel) signal that represents the sound component of the audio scene from the focus direction without any spatial characteristics. The focus extractor 310 may apply any suitable technique known in the art for extraction of the target audio signal. In the following, a non-limiting example of operation of the focus extractor 310 is provided with reference to a cascade of a beamformer 310a and a post filter 310b, as illustrated by the block diagram of FIG. 4. The beamformer 310a may comprise an adaptive beamformer or a static beamformer.

At a high level, the beamformer 310a is arranged to combine, in each frame, the frequency sub-band signals of four channels of the input FOA signal into a single-channel beamformed signal, whereas the post filter 310b is arranged to operate as an adjustable gain element at the output of the beamformer 310a. A generalized form of an equation that expresses combined operation of the beamformer 310a and the post filter 310b to derive the target audio signal y(b, n) is $$y(b,n)=g(k,n)w^H(k,n)x(b,n), \qquad (1)$$

where k denotes frequency sub-band, b denotes a frequency bin within the frequency sub-band k, n denotes a time index, g(k, n) denotes a gain of the post filter 310b, $w^H$(k, n) denotes a weight vector of the beamformer 310a for the frequency sub-band k and time index n, where the symbol H stands for the Hermitian transpose, and x(b, n) denotes a vector that represents the input FOA signal for the frequency bin b and time index n. In the equation (1), w(k, n) and x(b, n) are respective 4-by-1 vectors. In the equation (1) the same weight vector $w^H(k,n)$ and post filter gain g(k, n) may be applied to the input FOA signal x(b, n) for frequency bins b that are within the frequency sub-band k.

The weight vector w(k, n) may be generated using any beamforming method known in the art. An example in this regard, the beamformer 310a may comprise the minimum-variance distortionless response (MVDR) beamformer that operates to minimize interfering sound energy while having unity amplitude at the focus direction. A MVDR beamformer uses, for each frequency band k

- an estimate of a covariance matrix of the input FOA signal x(b, n) within the frequency bins b of the frequency sub-band k (either separately for each frame n or via average computed over a predefined number of consecutive time indices n); and
- a steering vector selected in accordance with the focus direction, which in case of a FOA signal may comprise a unit vector pointing towards the focus direction.

The beamformer 310a may be arranged to compute the weights vector w(k, n) based on the estimate of the covariance matrix and the steering vector using an MVDR formula well-known in the art.

The example of operation of the beamformer 310a described in the foregoing assumes usage of an adaptive beamformer. In another example, the beamformer 310a comprises a static beamformer, which may be arranged to compute the weight vector w(k, n) that represents a cardioid pick-up pattern towards the focus direction. In this example the weight vector w(k, n) is the same for all frequency sub-bands k. A cardioid pick-up pattern can be derived on basis of the input FOA signal as follows: Assuming v(n) as a 3×1 unit vector that points towards the focus direction (in the typical ACN Ambisonic $1^{st}$ order channel order y, z, x) at frame k, the cardioid pick-up pattern pointing towards the focus direction may be obtained by setting the beamform weights according to the following equation:

$$w(k, n) = 0.5 * \begin{bmatrix} 1 \\ v(n) \end{bmatrix}. \quad (2)$$

The post filter 310b may employ any suitable post filter known in the art. As an example, a post filter described in Delikaris-Manias, Symeon and Pulkki, Ville: "*Cross pattern coherence algorithm for spatial filtering applications utilizing microphone arrays*" (IEEE Transactions on Audio, Speech, and Language Processing 21, no. 11 (2013): pp. 2356-2367) adapted for processing of FOA signals may be applied. An example in this regard is described in the following.

The post filter 310b may be arranged to compute a cross-correlation $C_b$ between the omnidirectional channel (or component) w of the input FOA signal and a figure-of-eight signal having the positive lobe towards the focus direction according to the following equation:

$$C_b(b, n) = E\left[ x_W(b, n) \left( v^T(n) \begin{bmatrix} x_Y(b, n) \\ x_Z(b, n) \\ x_X(b, n) \end{bmatrix} \right)^* \right], \quad (3)$$

where $C_b$(b, n) denotes the cross-correlation in the frequency bin b for time index n, the signals x with sub-index w, y, z and x denote the respective channels (or components) of the input FOA signal x(b, n) in the frequency bin b for time index n, the asterisk * denotes the complex conjugate operation, and E denotes the expectation operator that may be provided, for example, as an average over a desired temporal area (e.g. over a predefined number of consecutive time indices n).

A real-valued non-negative cross-correlation measure for the frequency sub-band k for time index n may be formulated by $$C(k,n) = \max[0, \mathrm{Re}(\Sigma_{b \in k} C_b(b,n))], \quad (4)$$

where, in practical terms, C(k, n) indicates an energy estimate of the sound arriving from a region of the focus direction for the frequency sub-band k and time index n.

Consequently, energy D(k, n) in frequency bins within the frequency sub-band k at time index n in the beamformed signal $w^H(k,n)x(b,n)$ at the output signal of the beamformer 310a may be estimated according to $$D(k,n) = E[\Sigma_{b \in k} \, w^H(k,n)x(b,n)(w^H(k,n)x(b,n))^*]. \quad (5)$$

The gain of the post filter 310, g(k, n), may be obtained as $$g(k, n) = \min\left[1, \frac{C(k, n)}{D(k, n)}\right]. \quad (6)$$

The equation (6) implies that when the energy estimate C(k, n) of the sound arriving from the region of the focus direction is smaller than the energy D(k, n) of the beamformed signal at the output of the beamformer 310a, the post filter 310b operates to reduce the energy of the beamformed signal in the frequency sub-band k at time index n to derive the corresponding time-frequency tile of the target audio signal. On the other hand, in case the energy estimate C(k, n) of the sound arriving from the region of the focus direction is not smaller than the energy D(k, n) of the beamformed signal, the beamformed signal in the frequency sub-band k at time index n is applied as such as the corresponding time-frequency tile of the target audio signal. The post filter 310b hence serves to adjust the spectrum of the beamformed signal closer to that of the sounds arriving from a region of the focus direction.

Referring back to FIG. 3, the audio panner 312 receives the target audio signal from the focus extractor 310 and is configured to generate, on basis of the target audio signal, the focused spatial audio signal where the target audio signal is arranged in its original spatial position of the audio scene while the rest of the audio scene conveyed in the input spatial audio signal is omitted. The audio panner 312 may generate a FOA signal that represents the focused spatial audio signal $y_{FOA}$(b, n) for the frequency bin b and time index n using the target audio signal y(b, n) and the unit vector v(n) that points towards the focus direction by $$y_{FOA}(b, n) = y(b, n) \begin{bmatrix} 1 \\ v(n) \end{bmatrix}. \quad (7)$$

The focused spatial audio signal $y_{FOA}$(b, n) is provided for the audio mixer 314, which also receives the (transform-domain) input FOA signal x(b, n) that represents input spatial audio signal. In an example, the MDVR beamforming described in the foregoing may employ look-ahead and, consequently, the audio mixer 314 may apply suitable delay adjustment to channels of the focused spatial audio signal and/or to channels of the input spatial audio signal. The audio mixer 314 may derive the (transform-domain) output FOA signal $y_{MIX}$ that represents the intermediate spatial audio signal (i.e. the spatial audio signal with a focused sound component as denoted in FIGS. 1 and 3) as a linear combination of the focused spatial audio signal $y_{FOA}$ and the input spatial audio signal x, where the focused spatial audio signal $y_{FOA}$ is scaled by a scaling factor derived on basis of the focus strength. The scaling factor may have a value selected from the range 0 . . . $g_{max}$, such that value 0 indicates that no focus is applied while value $g_{max}$ indicates the maximum focus. The scaling factor typically has a value that is increased with increasing focus strength. Additionally, formation of the linear combination described above may involve application of a second scaling factor to scale the input spatial audio signal x, wherein the second scaling factor has a value that is decreased with increasing focus strength.

As an example in this regard, the audio mixer 314 may be arranged to derive the output FOA signal $y_{MIX}(b, n)$ that represents the intermediate spatial audio signal for the frequency bin b and time index n according to the following equation:

$$y_{MIX}(b,n)=a(n)y_{FOA}(b,n)+(1-a(n))x(b\ n), \quad (8)$$

where a(n) denotes the scaling factor for frame n that is derived on basis of the focus strength. Herein, the scaling factor a(n) has a value in the range 0 . . . 1 such that value 0 indicates that no focus is applied while value 1 indicates the maximum focus. In an example, the equation (8) is modified such that the FOA signal $y_{FOA}(b, n)$ representing the focused spatial audio signal is amplified by a further predefined scaling factor (e.g. having a value larger than 1, e.g. 4) to further emphasize the focus.

The output FOA signal $y_{MIX}(b, n)$ that represents the intermediate spatial audio signal in the transform domain is provided for the inverse filter bank 316 that is configured, as described in the foregoing, to transform each frame of the intermediate spatial audio signal from the transform domain back to the time domain for provision to the audio reproduction processor 106.

Figure 5:
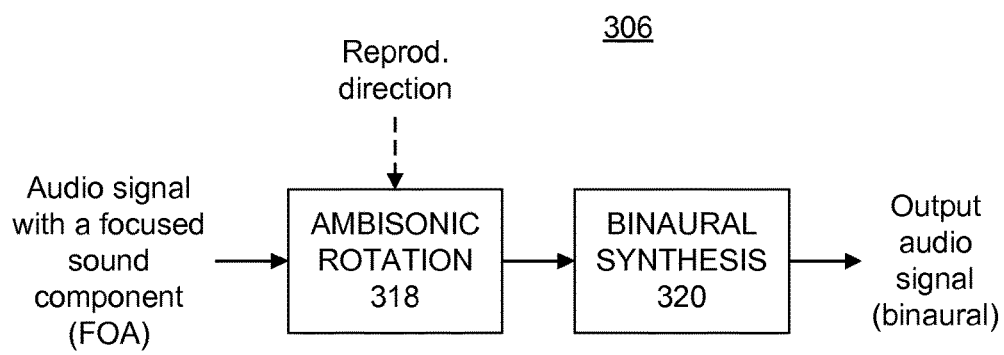
FIG. 5 illustrates a block diagram of some elements of an audio reproduction processor according to an example.

FIG. 5 illustrates a block diagram of some components and/or entities of an audio reproduction processor 306 according to an example. The audio reproduction processor 306 may be employed as the audio reproduction processor 106 in the framework of the spatial audio processing arrangement 100 to convert the intermediate spatial audio signal provided as an Ambisonic signal (such as the FOA signal applied in the examples provided in the foregoing) into the output spatial audio signal provided as a two-channel binaural signal for playback in accordance with an indication of reproduction orientation received at the audio reproduction processor 306.

The audio reproduction processor 306 comprises an Ambisonics rotation matrix processor 318 configured to rotate the audio scene conveyed by the FOA signal that represents the intermediate spatial audio signal from the nominal listening direction (or the nominal orientation) such that the indicated reproduction orientation indication becomes the front direction while spatial positions of directional sound components of the audio scene are repositioned accordingly to maintain their relative spatial positions with respect to each other. Hence, this rotation procedure modifies the channels of the FOA signal such that desired orientation with respect to the audio scene conveyed by the FOA signal is provided. In this regard, the ambisonics rotation processor 318 may generate a rotation matrix in dependence of the indicated reproduction orientation (in comparison to the nominal listening direction, i.e. that represented by intermediate spatial audio signal) and multiply the channels of the FOA signal using the rotation matrix. Techniques for such rotation of the audio scene of FOA signals (and HOA signals) are known in the art. The outcome of the rotation processing is a rotated intermediate spatial audio signal, which includes the focused sound component and where the listening direction (i.e. orientation with respect to the audio scene) has been modified in accordance with the indicated reproduction orientation. As a non-limiting example in this regard, the rotation processing may apply an approach defined in Laitinen, Mikko-Ville: "*Binaural reproduction for Directional Audio Coding*", Master of Science thesis, Helsinki University of Technology, Department of Signal Processing and Acoustics, 2008.

The audio reproduction processor 306 further comprises a binaural synthesizer 320 configured to convert the FOA signal that represents the rotated intermediate spatial audio signal into a two-channel binaural signal for playback via headphones. In this regard, the binaural synthesizer 320 may store a filter database including a plurality of pairs of predefined finite impulse response (FIR) filters, where each pair of FIR filters is employed to filter one spherical harmonic signal within the FOA (i.e. the four channels of the FOA signal) signal to generate the left and right channels for the binaural signal (while a similar filtering is applicable for Ambisonics signals in general). The binaural signal is the sum of such filtered two-channel outputs over all spherical harmonic signals (i.e. the channels of the FOA signal). The two-channel binaural signal is the output spatial audio signal of the audio reproduction processor 306. In other words, in case of FOA, four pairs of FIR filters may be provided, for example, as a 2-by-4 matrix of FIR filters. The FIR filters of the matrix of FIR filters applied by the binaural synthesizer 320 may have been generated by using an applicable least-squares optimization method known in the art with respect to a data set of head related impulse responses (HRIRs) or head-related transfer functions (HRTFs). An example of such a design procedure is to transform the HRIR data set to frequency bins (for example by FFT) to obtain the HRTF data set, and to determine for each frequency bin a complex-valued 2-by-4 processing matrix (for a FOA signal) that in a least-squares sense approximates the available HRTF data set at the data points of the HRTF data set. When all frequency bins for the 2-by-4 complex valued matrices are determined in such a way, the result can be inverse transformed (for example by inverse FFT) as time-domain FIR filters. Typically the FIR filters are also windowed, for example by using a Hanning window.

Figure 6:
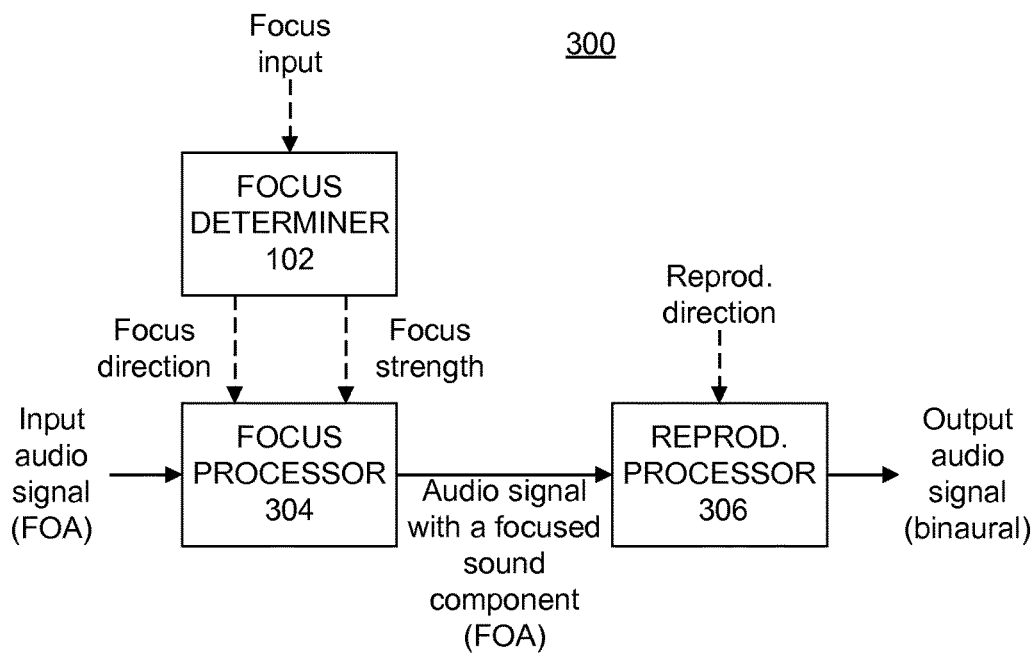
FIG. 6 illustrates a block diagram of some elements of a spatial audio processing arrangement according to an example.

In the foregoing, the audio focus processor 304 and the audio reproduction processor 306 are described as entities that are separate and independent of each other. However, as illustrated by the exemplifying block diagram of FIG. 6, the audio focus processor 304 and the audio reproduction processor 306 may be applied in the framework of the spatial audio processing arrangement 100 to provide a spatial audio processing arrangement 300 for processing the input spatial audio signal provided as a FOA signal into the output spatial audio signal provided as a two-channel binaural signal for headphone playback.

In the foregoing, a detailed example of processing the input spatial audio signal provided as a FOA signal into the intermediate spatial audio signal also provided as a FOA signal was described with references to the audio focus processor 304. In other examples, a spatial audio format different from the FOA (and Ambisonics in general) may be applied as the spatial audio format of the input spatial audio signal and the intermediate spatial audio signal.

Figure 7:
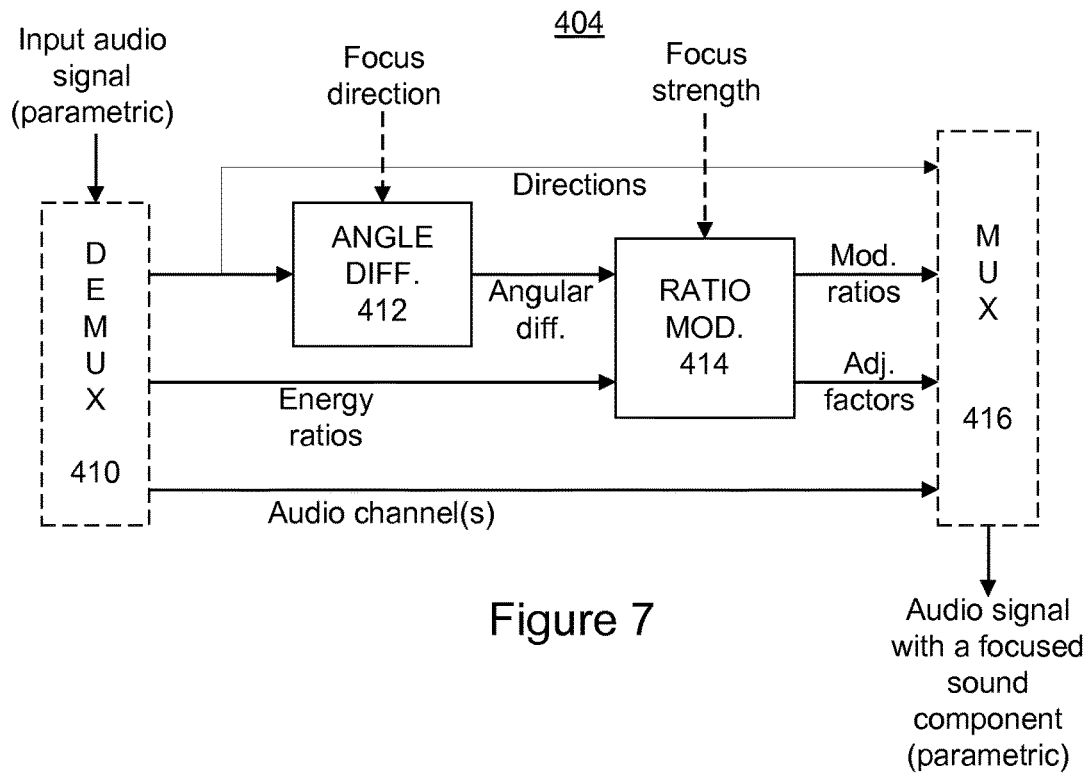
FIG. 7 illustrates a block diagram of some elements of an audio focus processor according to an example.

As a non-limiting example in this regard, FIG. 7 illustrates a block diagram of some components and/or entities of an audio focus processor 404 according to an example. The audio focus processor 404 is arranged to process input spatial audio signals that are provided as a parametric spatial audio signal into the intermediate spatial audio signal that are also provided as a parametric audio signal, and the audio focus processor 404 may be employed as the audio focus processor 104 in the framework of the spatial audio processing arrangement 100.

Without losing generality, in the following examples it is assumed that the input spatial audio signal provided as a parametric spatial audio signal comprises one or more audio channels and spatial metadata for one or more frequency bands. As an example, there may be two audio channels and spatial metadata for a plurality of frequency sub-bands. The spatial metadata comprises, for one or more frequency sub-bands and for a number of frames (i.e. for a number of time-frequency tiles) the following spatial parameters:

A direction indication that indicates a spatial direction of a directional sound component in the respective time-frequency tile.

An energy ratio parameter r(k, n) that indicates a ratio between the energy of the directional sound component in the respective time-frequency tile and the total energy of the respective time-frequency tile, i.e. for the frequency sub-band k for time index n. An energy ratio indicates the relative strength of the directional sound component in the respective time-frequency tile and has a value in the range 0 . . . 1.

The audio focus processor 404 is arranged to process the spatial metadata in order to modify relative intensity of sounds arriving from the focus direction in accordance with the focus strength, whereas this procedure may or may not further involve modification of the one or more audio channels.

The audio focus processor 404 receives the input spatial audio signal that comprises, for each frame, one or more audio channels, respective spatial directions for one or more frequency sub-bands and respective energy ratios r(k, n) for the one or more frequency sub-bands. The audio focus processor 404 may comprise a demultiplexer 410 that decomposes the information received as the input spatial audio signal into the audio channel(s), the directions and the energy ratios r(k, n). However, the demultiplexer 410 may be omitted and each of the audio channel(s), the directions and the energy ratios r(k, n) may be received by the audio focus processor 404 in a respective dedicated input signal.

The audio focus processor 404 comprises an angle difference calculator 412 configured to compute the respective angular differences β(k, n) between the focus direction and the direction indicated in the spatial metadata for the frequency sub-band k in frame n. The audio focus processor 404 further comprises a ratio modifier 414 configured to derive a modified energy ratio and a spectral adjustment factor for each of the frequency sub-bands on basis of the energy ratios r(k, n) indicated in the spatial metadata in view of the angular differences β(k, n) and further in view of the focus strength. Herein, the focus strength may be indicated, for example, via the scaling factor a(n) derived on basis of the indicated focus strength described in the foregoing in context of the audio mixer 312, which scaling factor a(n) has a value in the range 0 . . . 1 such that value 0 indicates that no focus is applied while value 1 indicates the maximum focus.

The ratio modifier 414 may be arranged to derive a direct-gain parameter f(k, n) for the frequency sub-band k and time index n on basis of the scaling factor a(n) and the angular difference β(k, n) obtained for the frequency sub-band k and time index n. In this regard, for example the following equation may be applied:

$$f(k, n) = (1 - a(n)) + a(n) * 4 * \max\{0, \min[1, func(\beta(k, n))]\}, \quad (9)$$
where $$func(\beta(k, n)) = \frac{50 - \beta(k, n)}{25}. \quad (10)$$

Assuming the maximum focus a(n)=1, when the angular difference β(k,n) is less than 25 degrees the equation (9) results in the direct-gain parameter f(k,n)=4, and when the angular difference β(k, n) is larger than 50 degrees the equation (9) results in the direct-gain parameter f(k,n)=0. When the angular differences β(k,n) is between 25 and 50 degrees, the equation (9) serves to interpolate the direct-gain parameter f(k,n) into a value between 4 and 0 in accordance with the angular difference β(k, n). Similar interpolation of the direct-gain parameter f(k, n) occurs in accordance with the value of the scaling factor a(n) for other non-zero values of the scaling factor a(n).

The equation (9) serves as a non-limiting example of deriving the direct-gain parameter f(k,n), which in general case may be defined by another predefined function of the angular difference β(k,n) where, between a predefined minimum angular difference (e.g. 25 degrees as in the example above) and a predefined maximum angular difference (e.g. 50 degrees as in the example above), the value of the direct-gain parameter f(k,n) increases with decreasing value of the angular difference β(k,n) while it is scaled in accordance with the scaling factor a(n). Consequently, with a non-zero value of the scaling factor a(n), the direct-gain parameter f(k, n) may be applied to amplify the sound arriving from the focus direction when the angular difference β(k,n) is small and attenuate the sound arriving from the focus direction when the angular difference β(k,n) is large.

An updated direct sound component energy value $E_D(k, n)$ in the frequency sub-band k at time index n may be computed as the product of the direct-gain parameter f(k, n) and the energy ratio parameter r(k, n), i.e.

$$E_D(k,n) = f(k,n) r(k,n). \quad (11)$$

An updated ambient sound component energy value $E_A(k, n)$ in the frequency sub-band k at time index n may be computed e.g. according to the following equation:

$$E_A(k,n) = (1 - r(k,n))(1 - a(n)). \quad (12)$$

A spectral adjustment factor s(k, n) for the frequency sub-band k and time index n may be computed based on the overall modification of the sound energy, e.g. by $$s(k,n) = \sqrt{E_D(k,n) + E_A(k,n)}. \quad (13)$$

A modified energy ratio parameter r'(k, n) in the frequency sub-band k in frame n may be computed by $$r'(k, n) = \frac{E_D(k, n)}{E_D(k, n) + E_A(k, n)}. \quad (14)$$

The undefined case where $E_D(k, n)=E_A(k, n)=0$ may result in setting the modified energy ratio parameter r'(k, n) for the frequency sub-band k and time index n to a zero value. The modified energy ratio parameter r'(k, n) for the frequency sub-band k and time index n may be applied to replace the received energy ratio parameter r(k, n) of the corresponding time-frequency tile in the spatial metadata.

The audio focus processor 404 may further comprise a multiplexer 416 configured to combine the audio channel(s), the directions and the modified energy ratios into the intermediate spatial audio signal provided as a parametric spatial audio signal, where the directions and the modified energy ratios r'(k, n) constitute (modified) spatial metadata at the output of the audio focus processor 404. Moreover, the multiplexer 416 may further complement the spatial metadata with the spectral adjustment factors s(k, n) or, alternatively, provide the spectral adjustment factors s(k, n) as a further output of the audio focus processor (in parallel with the intermediate spatial audio signal). However, the multiplexer 416 may be omitted and each of the audio channel(s), the directions, the modified energy ratios r'(k, n) and the spectral adjustment factors s(k, n) may be provided as respective separate output signals of the audio focus processor 404.

Figure 8A:
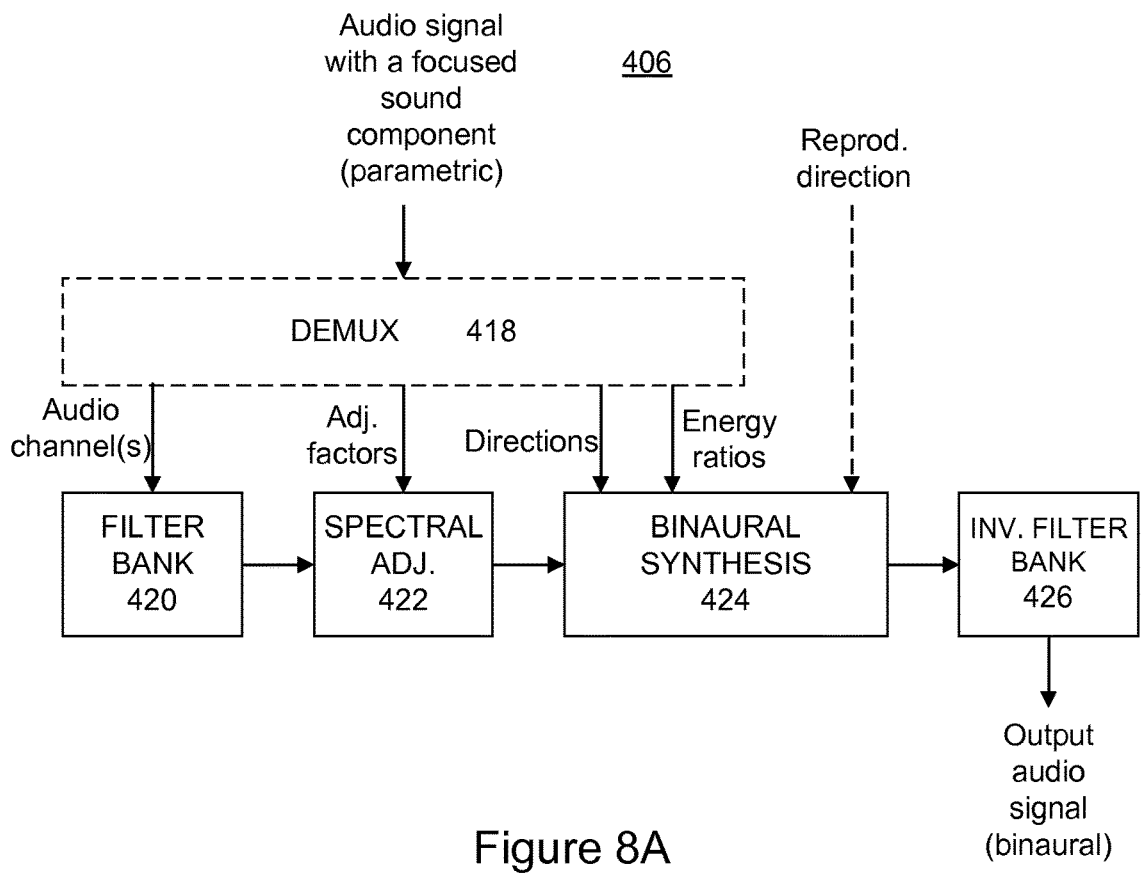
FIG. 8A illustrates a block diagram of some elements of an audio reproduction processor according to an example.

FIG. 8A illustrates a block diagram of some components and/or entities of an audio reproduction processor 406 according to an example. The audio reproduction processor 406 may be employed as the audio reproduction processor 104 in the framework of the spatial audio processing arrangement 100 to convert the intermediate spatial audio signal provided as a parametric spatial audio signal into the output spatial audio signal provided as a two-channel binaural signal for playback in accordance with an indication of the reproduction orientation received at the audio reproduction processor 406.

The audio reproduction processor 406 receives the intermediate spatial audio signal that comprises, for each frame, one or more audio channels and the spatial metadata described in the foregoing. The spatial metadata includes the respective spatial direction for one or more frequency sub-bands and the respective energy ratios r(k, n) for the one or more frequency sub-bands. The energy ratios r(k, n) may comprise the modified energy ratios r'(k, n) derived by the audio focus processor 404, and in the following the description of the audio reproduction processor 406 simply refers to the energy ratios r'(k, n). The spatial metadata further comprises or it is accompanied with respective spectral adjustment factors s(k, n) for the one or more frequency sub-bands.

The audio reproduction processor 406 may comprise a demultiplexer 418 that decomposes the information received as the input spatial audio signal into the one or more audio channels, the directions, the energy ratios r'(k, n) and the spectral adjustment factors s(k, n). However, the multiplexer 418 may be omitted and each of the one or more audio channels, the directions, the energy ratios r'(k, n) and the spectral adjustment factors s(k, n) may be received by the audio reproduction processor 406 in a respective dedicated input signal.

The audio reproduction processor 406 comprises a filter bank 420 for transforming each of the one or more audio channels of the intermediate spatial audio signal from time domain into a transform domain, a spectral adjuster 422 for enhancing the one or more audio channels in dependence of the spectral adjustment factors s(k, n), a binaural synthesizer 424 for processing the one or more enhanced audio channels into a two-channel binaural signal for playback via headphones in accordance of the indicated reproduction orientation, and an inverse filter bank 426 for transforming the two-channel binaural signal from the transform domain back to the time domain The filter bank 420 is arranged to transform each of the one or more audio channels from the time domain to the transform domain, whereas the inverse filter bank 426 is arranged to transform the channels of two-channel binaural signal from the transform domain back to the time domain. The operation of the filter bank 420 and the inverse filter bank 426 corresponds, respectively, to that of the filter bank 308 and the inverse filter bank 316 described in the foregoing in context of the audio focus processor 304 and the description of their operation provided therein applies to the filter bank 420 and the inverse filter bank 426, mutatis mutandis.

The spectral adjuster 422 is configured to enhance the one or more audio channels via application of the spectral adjustment factors s(k, n), thereby resulting in enhanced one or more audio channels. In this regard, the spectral adjuster 422 may be arranged to multiply (the frequency bins in) each the one or more audio channels in the frequency sub-band k at time index n by the respective spectral adjustment factor s(k, n). Hence, the enhancement processing by the spectral adjuster 422 operates to amplify the part of the spatial sound arriving from the focus direction and/or to attenuate the part of the spatial sound that is not arriving from the focus direction in accordance with the focus strength, thereby completing audio focus related processing carried out by the ratio modifier 414.

The spectral adjuster 422 is described herein as a component of the audio reproduction processor 406 for improved computational efficiency it brings in a scenario where the audio reproduction processor 406 is operated together with the audio focus processor 404: since a binaural synthesizer 424 (which is described in more detail in the following) processes a transform-domain signal, providing the spectral adjuster together with the binaural synthesizer 424 enables dispensing with a separate conversion from the time domain to the transform domain and back in the audio focus processor 404. Nevertheless, although described herein as a component of the audio reproduction processor 406, the spectral adjuster 422 may be, alternatively, provided as part of the audio focus processor 404. As described above, this would require including the filter bank 420 and the inverse filter bank 426 (or equivalent processing entities) in the audio focus processor 404 for converting the audio channel(s) of the spatial input audio signal into the transform domain for the spectral adjustment processing and back to time domain for provision as the (time-domain) intermediate spatial audio signal.

The binaural synthesizer 424 is configured to process the one or more enhanced audio channels into a two-channel binaural signal for playback via headphones in accordance with the indicated reproduction orientation. The binaural synthesizer 424 may apply any parametric spatial synthesis technique known in the art to generate the two-channel binaural signal (in the transform domain) on basis of the enhanced audio channels. In this regard, the focus processing has been already applied to the audio channels and the spatial metadata and hence the operation of the binaural synthesizer 424 serves to rotate the audio scene represented by the enhanced audio channels, the directions and the energy ratios r'(k, n) in accordance with the indicated reproduction orientation and to convert the rotated audio scene into the two-channel binaural signal that is suitable for reproduction to a user.

As a non-limiting example, the binaural synthesis in the binaural synthesizer 424 may involve the following:

- Dividing the audio signal at each channel of enhanced audio channels into directional and non-directional parts in frequency sub-bands by multiplying each enhanced audio channel by factor $\sqrt{r'(k,n)}$ to obtain the directional part and by factor $\sqrt{1-r'(k,n)}$ to obtain the non-directional part;
- Rotating the direction parameter for each frequency sub-band to account for the indicated reproduction orientation;
- Generating, at each frequency sub-band, a respective single-channel composite signal as combination of the directional parts across the channels (e.g. as a sum across channels) and processing the frequency sub-bands of the composite signal using a pair of HRTFs selected according to the rotated direction parameter to generate respective frequency sub-bands of a (two-channel) spatialized directional signal.
- Assuming that the intermediate spatial audio signal consists of two audio channels, processing the non-directional part with suitable decorrelating operations that generate a binaural diffuse field coherence for the non-directional signal.
- Combining, at each frequency sub-band, the processed non-directional signal with the spatialized directional signal (at both channels) e.g. as a sum of the non-directional signal and the respective channel of the spatialized directional signal to obtain the final two-channel binaural signal in the transform domain that serves as input to the inverse filter bank 426.

As described in the foregoing, the inverse filter bank 426 transforms each of the channels of the binaural signal generated in the binaural synthesizer 424 from the transform-domain back to the time domain for provision as the output spatial audio signal of the audio reproduction processor 406.

Figure 8B:
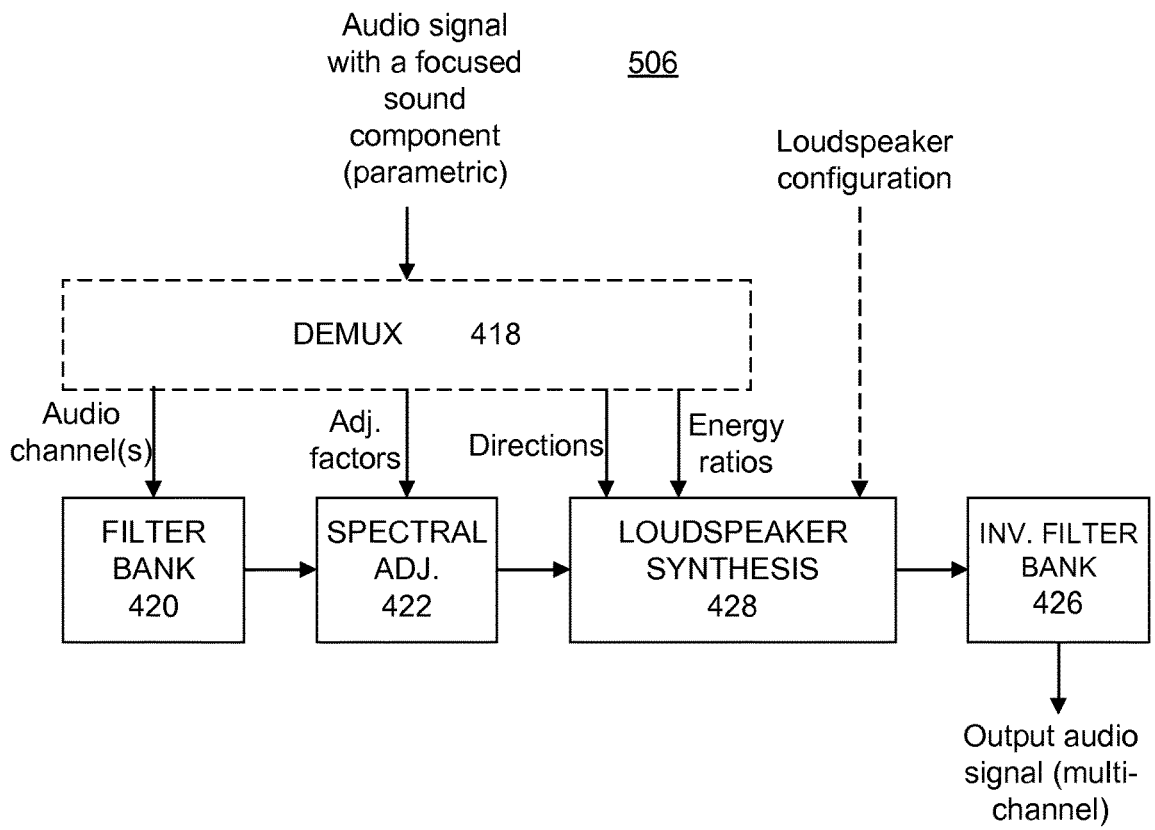
FIG. 8B illustrates a block diagram of some elements of an audio reproduction processor according to an example.

FIG. 8B illustrates a block diagram of some components and/or entities of an audio reproduction processor 506 according to an example. The audio reproduction processor 506 may be employed as the audio reproduction processor 104 in the framework of the spatial audio processing arrangement 100 to convert the intermediate spatial audio signal provided as a parametric spatial audio signal into the output spatial audio signal provided as a multi-channel loudspeaker signal according to a predefined loudspeaker configuration.

The audio reproduction processor 506 comprises the demultiplexer 418, the filter bank 420 and the spectral adjuster 422 that are similar those described in the foregoing in context of the audio reproduction processor 406. Furthermore, the functionality of the inverse filter bank 426 included in the audio reproduction processor 506 is similar to that described in the foregoing in context of the audio reproduction processor 406, with the exception that in context of the audio reproduction processor 506 the inverse filter bank 426 is arranged to transform each of the loudspeaker channels generated in a loudspeaker synthesizer 428 from the transform-domain back to the time domain for provision as the output spatial audio signal of the audio reproduction processor 506.

The audio reproduction processor 506 further comprises the loudspeaker synthesizer 428 for processing the one or more enhanced audio channels obtained from the spectral adjuster 244 into a multi-channel signal according to a predefined loudspeaker configuration. The indication of the predefined loudspeaker configuration may comprise respective indications of positions of the loudspeakers with respect to each other and/or with respect to a predefined reference point. The audio reproduction processor 506 may apply any technique known in art for converting one or more enhanced audio channels from the parametric spatial audio format into the multi-channel loudspeaker signal according to the predefined loudspeaker configuration. Unlike in the case of the audio reproduction processor 406, explicit rotation of the audio scene represented by the one or more enhanced audio channels is not needed since a set of loudspeakers is applied to reproduce the audio scene in its entirety and the listener may select or adjust the listening angle or orientation simply by turning his/head accordingly. As a non-limiting example, the audio reproduction processor 506 may provide the conversion from parametric spatial audio format to into the loudspeaker signal according to the applied loudspeaker configuration using the method(s) described in Vilkamo, Juha and Pulkki, Ville: "*Minimization of decorrelator artifacts in directional audio coding by covariance domain rendering*", Journal of the Audio Engineering Society 61, no. 9 (2013), pp. 637-646.

Figure 9A:
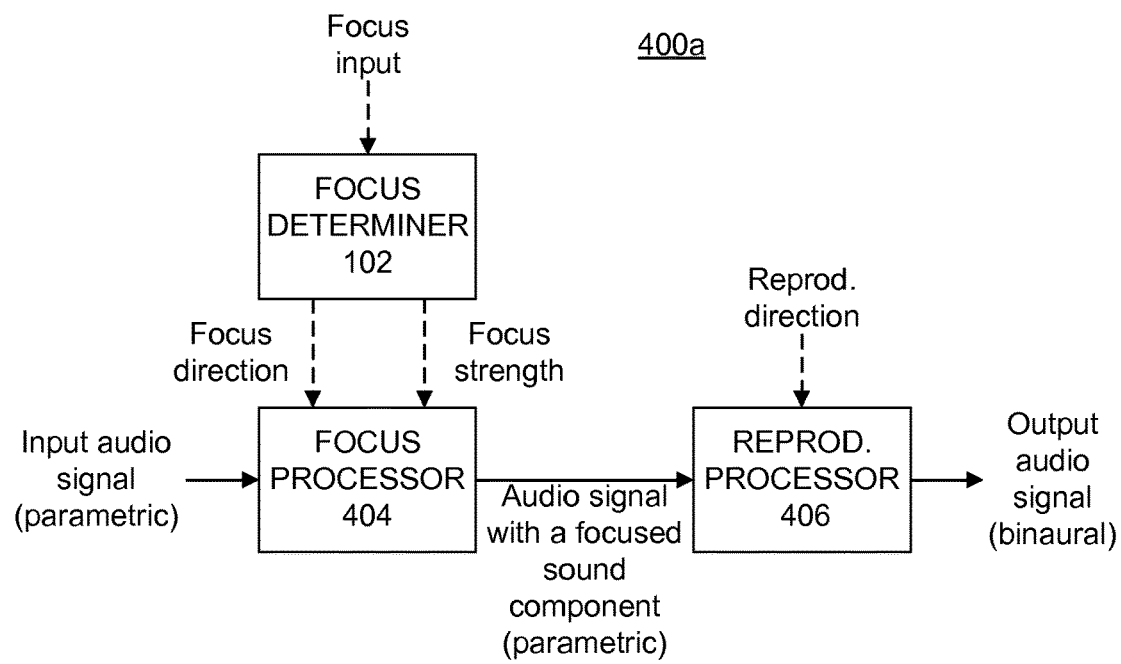
FIG. 9A illustrates a block diagram of some elements of a spatial audio processing arrangement according to an example.

In the foregoing, the audio focus processor 404 and the audio reproduction processor 406 are described as entities that are separate and independent of each other. However, as illustrated by the exemplifying block diagram of FIG. 9A, the audio focus processor 404 and the audio reproduction processor 406 may be applied in the framework of the spatial audio processing arrangement 100 to provide a spatial audio processing arrangement 400a for processing the input spatial audio signal provided as a parametric spatial audio signal into the output spatial audio signal provided as a two-channel binaural signal for headphone playback.

Figure 9B:
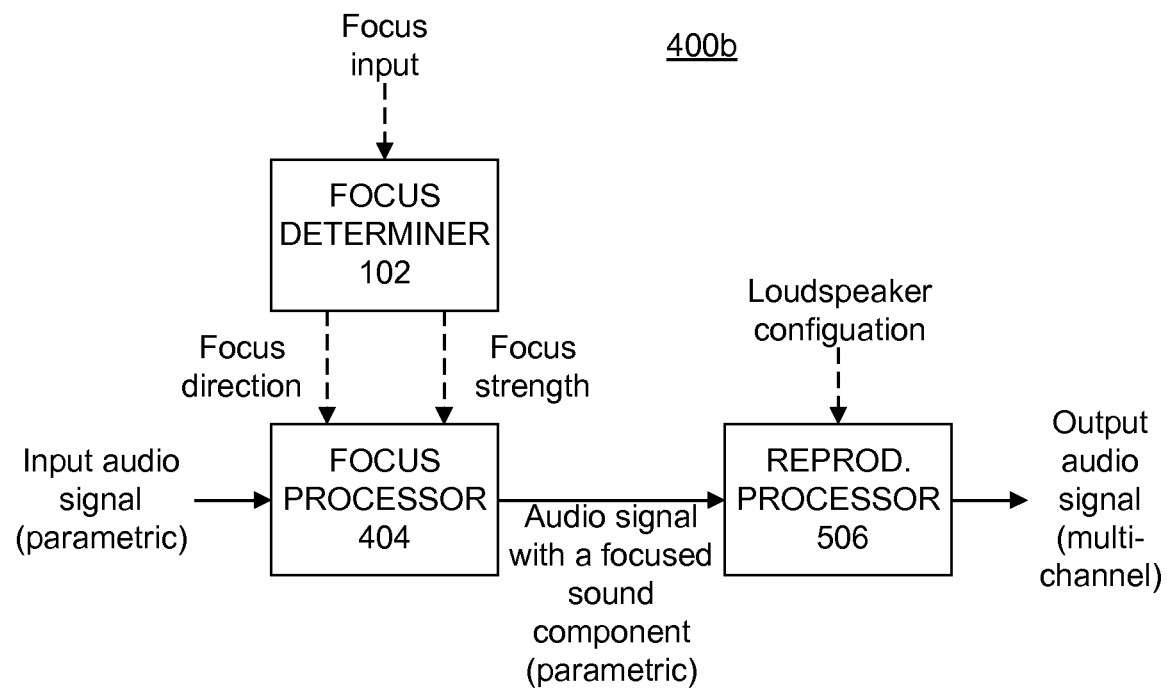
FIG. 9B illustrates a block diagram of some elements of a spatial audio processing arrangement according to an example.

Along similar lines, the audio focus processor 404 and the audio reproduction processor 506 are described as entities that are separate and independent of each other. However, as illustrated by the exemplifying block diagram of FIG. 9B, the audio focus processor 404 and the audio reproduction processor 506 may be applied in the framework of the spatial audio processing arrangement 100 to provide a spatial audio processing arrangement 400b for processing the input spatial audio signal provided as a parametric spatial audio signal into the output spatial audio signal provided as a multi-channel loudspeaker signal according to a predefined loudspeaker configuration.

Figure 10:
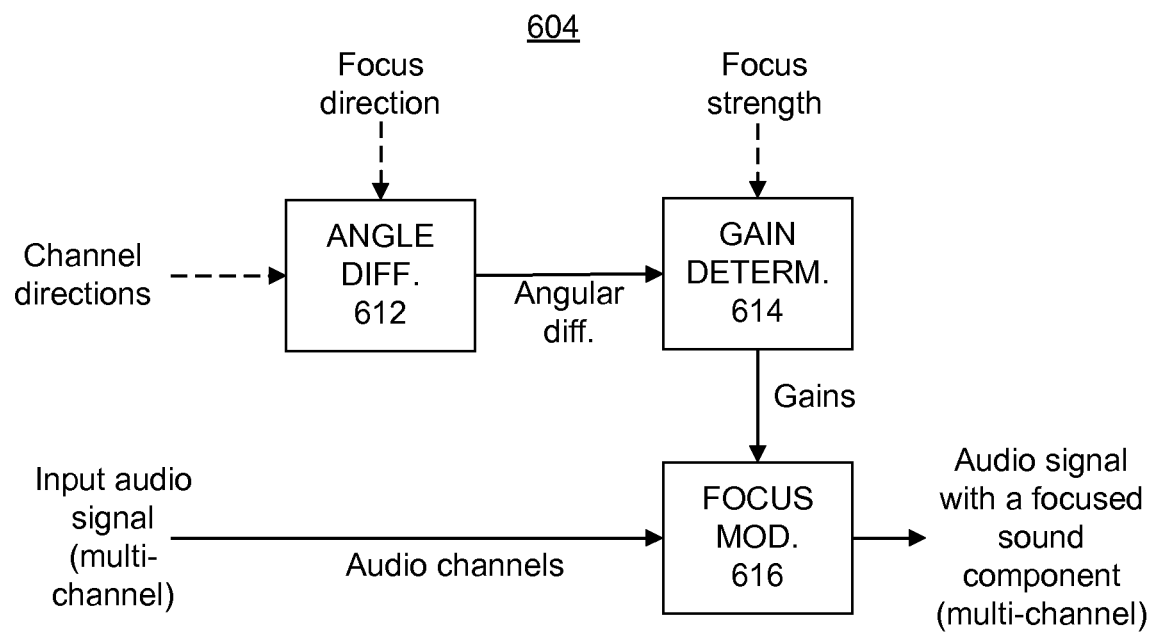
FIG. 10 illustrates a block diagram of some elements of an audio focus processor according to an example.

FIG. 10 illustrates a block diagram of some components and/or entities of an audio focus processor 604 according to an example. The audio focus processor is arranged to process input spatial audio signals provided as a multi-channel loudspeaker signal into the intermediate spatial audio signal also provided as a multi-channel loudspeaker signal, and the audio focus processor 604 may be employed as the audio focus processor 104 in the framework of the spatial audio processing arrangement 100.

The audio focus processor 604 comprises an angle difference calculator 612 arranged to compute the respective angular differences $\beta(n)$ between the focus direction and a loudspeaker direction in frame n for each audio channel of the multi-channel loudspeaker signal received as the input spatial audio signal. The loudspeaker directions may be provided to the audio focus processor 604 (and to the angle difference calculator 612) as an input signal or the angle difference calculator 612 may have predefined information concerning the applicable loudspeaker directions. A loudspeaker direction corresponding to a given channel (and hence to a given loudspeaker) may be defined, for example, as an azimuth angle between direction of the given loudspeaker and a predefined reference direction. Since the audio focus processor 604 does not decompose the audio channels into a plurality of frequency sub-bands, each audio channel in each frame is, conceptually, processed as a single frequency (sub-)band.

The audio focus processor 604 further comprises a gain determiner 614 arranged to compute a respective direct-gain parameter f(n) for each audio channel of the multi-channel loudspeaker signal in frame n. Computation of the direct-gain parameters f(n) may be carried in a manner similar to that applied in the ratio modifier 414 described in the foregoing, e.g. using the equations (9) and (10) with the exception that in case of the gain determiner 614 the direct-gain parameter f(n) is derived, for each audio channel, in a single frequency (sub-)band.

The audio focus processor 604 further comprises a focus modifier 616 arranged to modify the audio channels of the multi-channel loudspeaker signal in accordance with the direct-gain parameter f(n) derived therefor. In this regard, the focus modifier 616 may multiply the signal in each of the audio channels of the multi-channel loudspeaker with the direct-gain parameter derived for the respective audio channel, thereby deriving a modified multi-channel loudspeaker signal with a focused sound component that may be provided as the intermediate spatial audio signal at the output of the audio focus processor 604.

Figure 11A:
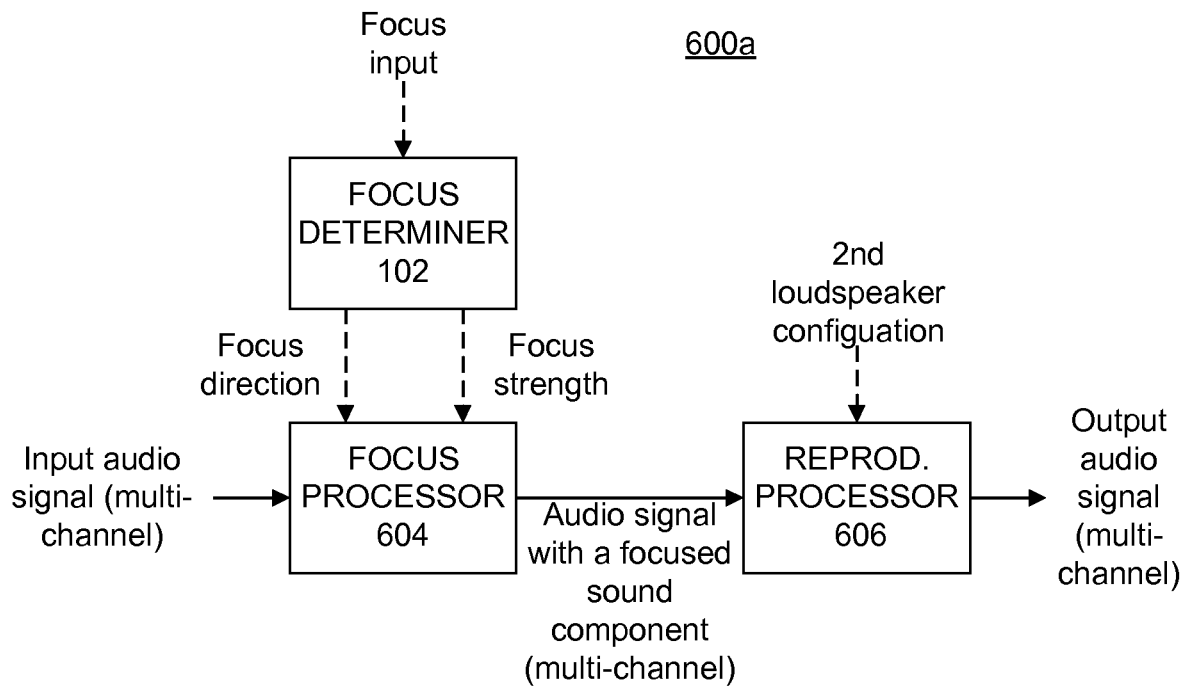
FIG. 11A illustrates a block diagram of some elements of a spatial audio processing arrangement according to an example.

FIG. 11A illustrates the audio focus processor 604 in the framework of the spatial audio processing arrangement 100 to provide a spatial audio processing arrangement 600a for processing the input spatial audio signal provided as a multi-channel loudspeaker signal according a first loudspeaker configuration into the output spatial audio signal provided as a multi-channel loudspeaker signal according to a second loudspeaker configuration. The indication of the second loudspeaker configuration may be received as the reproduction control information.

The spatial audio processing arrangement 600a includes an audio reproduction processor 606 arranged to convert the intermediate spatial audio signal provided as a multi-channel loudspeaker signal according to the first loudspeaker configuration into the output spatial audio signal provided as a multi-channel loudspeaker signal according to the second loudspeaker configuration. The conversion from the first loudspeaker configuration to the second loudspeaker configuration may be provided, for example, using the vector-base amplitude panning (VBAP) or another suitable amplitude panning technique known in the art. A method applying an amplitude panning technique (such as VBAP) involves deriving a N-by-M matrix of amplitude panning gains that define conversion from M channels of the first loudspeaker configuration to the N channels of the second loudspeaker configuration and using the matrix to multiply the channels of the intermediate spatial audio signal provided as a multi-channel loudspeaker signal according to the first loudspeaker configuration. As a non-limiting example, derivation of VBAP amplitude panning gains is provided in Pulkki, Ville: "*Virtual sound source positioning using vector base amplitude panning*", Journal of the audio engineering society 45, no. 6 (1997), pp. 456-466.

In a variation of the spatial audio processing arrangement 600a the loudspeaker configuration is the same for the input spatial audio signal and the output spatial audio signal. In such a scenario, the intermediate spatial audio signal provided as the output of the audio focus processor 604 may be directly applied as the output spatial audio signal.

Figure 11B:
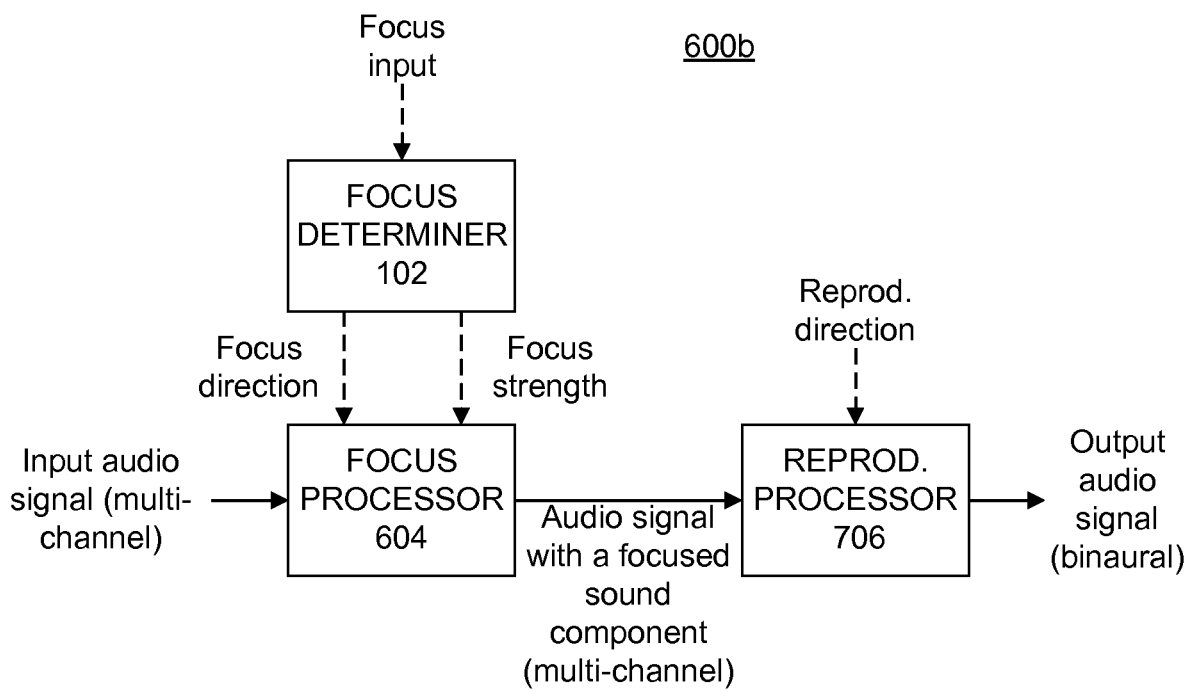
FIG. 11B illustrates a block diagram of some elements of a spatial audio processing arrangement according to an example.

FIG. 11B illustrates the audio focus processor 604 in the framework of the spatial audio processing arrangement 100 to provide a spatial audio processing arrangement 600b for processing the input spatial audio signal provided as a multi-channel loudspeaker signal according a predefined loudspeaker configuration into the output spatial audio signal provided as a two-channel binaural signal for headphone playback.

The spatial audio processing arrangement 600b includes an audio reproduction processor 706 arranged to convert the intermediate spatial audio signal provided as a multi-channel loudspeaker signal according to the predefined loudspeaker configuration into the output spatial audio signal provided as the two-channel binaural signal in accordance with the indicated reproduction orientation. As an example, this may involve the audio reproduction processor 706 processing the audio channels of the intermediate spatial audio signal to rotate the audio scene represented therein in accordance with the reproduction orientation and converting the processed audio channels from those of the multi-channel loudspeaker signal according to the predefined loudspeaker configuration into the two-channel binaural signal that serves as the output spatial audio signal. As another example, the rotation of the audio scene may be carried out as part of the conversion from the multi-channel loudspeaker signal into the two-channel binaural signal, e.g. such that a set of HRTFs that are applied to implement the conversion is selected in dependence of the indicated reproduction orientation. Various techniques for converting the multi-channel loudspeaker signal according to a certain loudspeaker configuration into a two-channel binaural signal are known in the art. As an example, the audio reproduction processor 706 may apply HRTF processing known in the art to derive the two channels of the binaural signal on basis of channels of the multi-channel loudspeaker signal, complemented with introduction of a predefined (synthetic) reverberation component in order to generate an auditory impression of a real-world listening environment (such as a room of certain size or an outdoor space). As a non-limiting example in this regard, the conversion from the multi-channel loudspeaker signal to the binaural signal may apply e.g. a method described in U.S. Pat. No. 9,860,666 B2.

The spatial audio processing system 100 as well as the spatial audio processing arrangements 300, 400a, 400b, 600a and 600b include the audio focus determiner 102 arranged to derive at least one of the focus direction and the focus strength in dependence of the focus input provided thereto.

In an example, the focus input for the audio focus determiner 102 may be derived by a using a sensor arrangement comprising one or more motion sensors, which sensor arrangement is configured to detect at least one aspect of arm position of a person wearing the user-wearable device and to convey arm position information that defines the at least one aspect of the arm position as the focus input to the audio focus determiner 102. The arm position information may comprise an indication of a direction at which the arm of the user is pointing or an indication of a change in direction at which the arm of the user is pointing. The audio focus determiner 102 may use this information to derive the focus direction. The arm position information may further comprise an indication of the angle between the forearm and the upper arm of the user. The audio focus determiner 102 may use this information to derive the focus strength e.g. via the following equation:

$$\text{focus\_strength} = \frac{\text{arm angle in degrees}}{180}. \quad (15)$$

The focus strength derived according to the equation (15) may be directly applied as the scaling factor a(n) described in the foregoing or the scaling factor a(n) may be derived from the focus strength according to the equation (15) via a predefined mapping function.

In a variation of the above example, the sensor arrangement may be configured to track position of a finger of the user instead of arm position. In another variation of the above example, the sensor arrangement may be configured to derive only one aspect of the focus, whereas the other aspect of the focus is derivable using another user input means. As an example in this regard, the sensor arrangement may serve to derive the focus strength in accordance with the position of the user's arm (or that of the user's finger), whereas the focus direction may be derived (using another tracking means) e.g. based on the orientation of the user's head.

In the example above, the sensor arrangement comprises one or more motion sensors arranged in a user-wearable device, such as head-mounted display device. In another example, the sensor arrangement comprises one or more motion sensors arranged in a device that is positioned in the environment of the user. In a further example, the sensor arrangement comprises a combination of one or more motion sensors arranged in a user-wearable device and one or more motion sensors arranged in a device that is positioned in the environment of the user.

In a variation of the above example, the sensor arrangement may comprise one or more infrared cameras arranged in the environment of the user, whereas the user is wearing e.g. a specific shirt or a glove that is detectable in images captured by the one or more infrared cameras, and the audio focus determiner 102 may be arranged to derive the arm position (or the finger position) based on the images captured by the one or more infrared cameras received therein as the focus input.

In another example, the focus input for the audio focus determiner 102 may be derived by using a hand-held pointer device together with a hand-held touch-sensitive controller device, the focus input thereby comprising one or more indications concerning the orientation of the pointer device and one more indications of user-inputted sliding gestures received via the touch-sensitive controller device: the audio focus determiner 102 may be arranged to derive the focus direction on basis of the orientation of the pointer device and to derive the focus strength or a change thereof (e.g. set or adjust the value of the scaling factor a(n) e.g. within the range 0 . . . 1 accordingly) on basis of the sliding gestures.

Figure 12:
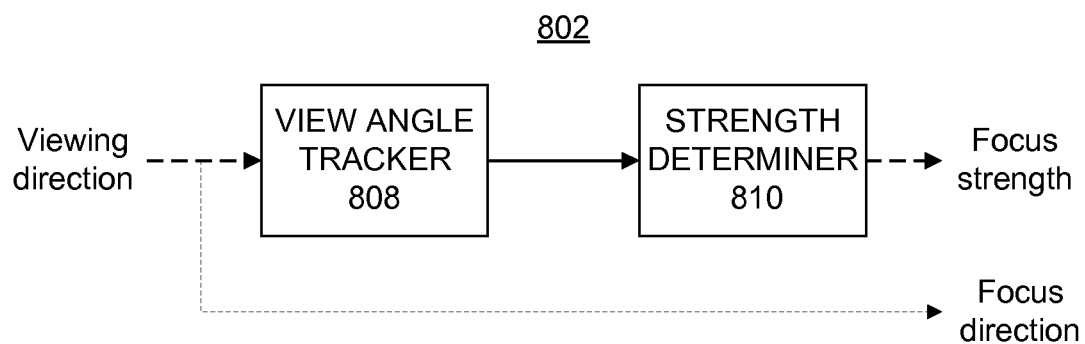
FIG. 12 illustrates a block diagram of some elements of an audio focus determiner according to an example.

FIG. 12 illustrates a block diagram of some components and/or entities of the audio focus determiner 802 according to a further example. The audio focus determiner 802 may be employed as the audio focus determiner 102 in the framework of the spatial audio processing arrangement 100. The focus input provided to the audio focus determiner 802 comprises an indication of the current viewing direction applied by the user. The viewing direction may be received e.g. from a head-mounted display device or a head tracking device worn by the user. The audio focus determiner 802 serves to output the viewing direction as the focus direction, whereas the focus strength is derived as described in the following.

The audio focus determiner 802 is arranged to keep track of the focus strength on basis of the change of the viewing direction over time, wherein the focus strength is initially set to zero. The audio focus determiner 802 comprises a viewing angle tracker 808 arranged to track the current viewing direction at predefined time intervals, e.g. 50 times per second. At each observation, the viewing angle tracker 808 records the absolute angular change a(n) in viewing direction in comparison to the (immediately) preceding observation of the viewing direction, thereby providing a time series of angular changes a(n). The viewing angle tracker 808 further computes a change speed measure on basis of the absolute angular changes a(n) with a predefined time period (e.g. a predefined number of consecutive angular changes a(n)), such as one second. As non-limiting examples, the change speed measure may be computed as a sum or as an average of the absolute angular changes a(n) over the predefined time period. In some examples, the viewing angle tracker 808 may apply smoothing of the viewing direction indications (e.g. a suitable lowpass filtering) before using them for computation of the absolute angular change a(n).

The audio focus determiner 802 further comprises a focus strength determiner 810 arranged to derive the focus strength on basis of the change speed measure computed in the viewing angle tracker 808. The determined focus strength may be provided as the output of the audio focus determiner 802, e.g. to the audio focus processor 104, 304, 404, 604. In this regard, the focus strength determiner 810 may operate to increase the focus strength with decreasing change speed and to decrease the focus strength with increasing change speed. This may be provided, for example, in the following manner:

- if the change speed measure indicates a change speed that is less than a first predetermined threshold (e.g. 10 degrees per second), the focus strength is increased by a predetermined amount (e.g. 0.05);
- if the change speed measure indicates a change speed that exceeds a second predetermined threshold (e.g. 30 degrees per second), the focus strength is set to a predetermined value (e.g. zero or other relatively small value);
- the focus strength is not decreased below a predefined minimum value (e.g. zero) and it is not increased above a predefined maximum value (e.g. 0.7)

In the foregoing, the spatial audio processing arrangements 100, 300, 400a, 400b, 600a and 600b and components thereof have been described as independent stand-alone systems that are useable as such for processing of spatial audio signals independently of e.g. multi-view video content. However, in a typical use case the multi-view audio is provided together with multi-view video and hence the spatial audio processing arrangements 100, 300, 400a, 400b, 600a or 600b or components thereof are typically implemented as part of a virtual reality (VR) system that provides an immersive audio-visual user experience with spatial audio. In such audio-visual system at least some aspect of the control information provided as input to the spatial audio processing arrangement 100, 300, 400a, 400b, 600a, 600b or components thereof may be derivable from the video processing part of such an audio-visual system. In particular, at least part of the focus input (to the audio focus determiner 102, 802) and/or at least part of the reproduction control information (provided to the reproduction processor 106, 306, 406, 506, 606, 706 may originate from the video processing part of the audio-visual system.

Figure 13:
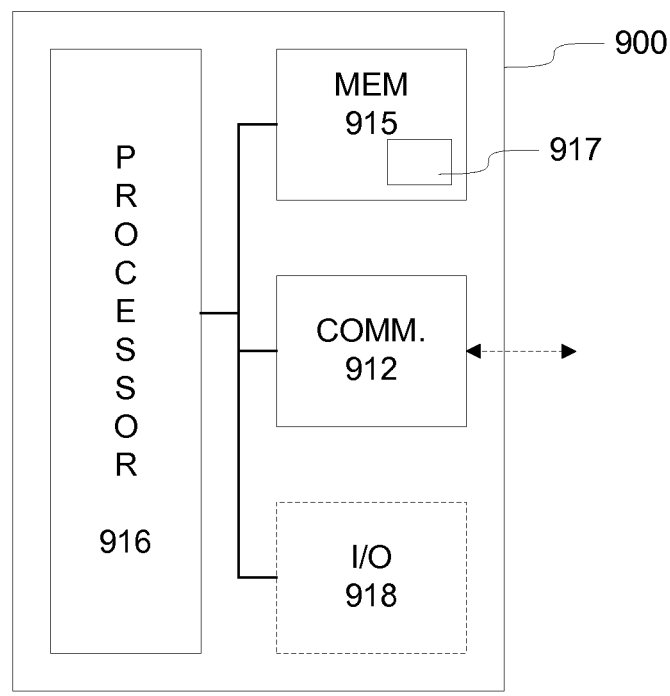
FIG. 13 illustrates a block diagram of some elements of an apparatus according to an example.

FIG. 13 illustrates a block diagram of some components of an exemplifying apparatus 900. The apparatus 900 may comprise further components, elements or portions that are not depicted in FIG. 13. The apparatus 900 may be employed e.g. in implementing one or more components described in the foregoing in context of the spatial audio processing arrangements 100, 300, 400a, 400b, 600a, 600b.

The apparatus 900 comprises a processor 916 and a memory 915 for storing data and computer program code 917. The memory 915 and a portion of the computer program code 917 stored therein may be further arranged to, with the processor 916, to implement at least some of the operations, procedures and/or functions described in the foregoing in context of the spatial audio processing arrangements 100, 300, 400a, 400b, 600a, 600b or one or more components thereof.

The apparatus 900 comprises a communication portion 912 for communication with other devices. The communication portion 912 comprises at least one communication apparatus that enables wired or wireless communication with other apparatuses. A communication apparatus of the communication portion 912 may also be referred to as a respective communication means.

The apparatus 900 may further comprise user I/O (input/output) components 918 that may be arranged, possibly together with the processor 916 and a portion of the computer program code 917, to provide a user interface for receiving input from a user of the apparatus 900 and/or providing output to the user of the apparatus 900 to control at least some aspects of operation of the spatial audio processing arrangements 100, 300, 400a, 400b, 600a, 600b or one or more components thereof that are implemented by the apparatus 900. The user I/O components 918 may comprise hardware components such as a display, a touchscreen, a touchpad, a mouse, a keyboard, and/or an arrangement of one or more keys or buttons, etc. The user I/O components 918 may be also referred to as peripherals. The processor 916 may be arranged to control operation of the apparatus 900 e.g. in accordance with a portion of the computer program code 917 and possibly further in accordance with the user input received via the user I/O components 918 and/or in accordance with information received via the communication portion 912.

Although the processor 916 is depicted as a single component, it may be implemented as one or more separate processing components. Similarly, although the memory 915 is depicted as a single component, it may be implemented as one or more separate components, some or all of which may be integrated/removable and/or may provide permanent/semi-permanent/dynamic/cached storage.

The computer program code 917 stored in the memory 915, may comprise computer-executable instructions that control one or more aspects of operation of the apparatus 900 when loaded into the processor 916. As an example, the computer-executable instructions may be provided as one or more sequences of one or more instructions.

The processor 916 is able to load and execute the computer program code 917 by reading the one or more sequences of one or more instructions included therein from the memory 915. The one or more sequences of one or more instructions may be configured to, when executed by the processor 916, cause the apparatus 900 to carry out at least some of the operations, procedures and/or functions described in the foregoing in context of the spatial audio processing arrangements 100, 300, 400a, 400b, 600a, 600b or one or more components thereof.

Hence, the apparatus 900 may comprise at least one processor 916 and at least one memory 915 including the computer program code 917 for one or more programs, the at least one memory 915 and the computer program code 917 configured to, with the at least one processor 916, cause the apparatus 900 to perform at least some of the operations, procedures and/or functions described in the foregoing in context of the spatial audio processing arrangements 100, 300, 400a, 400b, 600a, 600b or one or more components thereof.

The computer programs stored in the memory 915 may be provided e.g. as a respective computer program product comprising at least one computer-readable non-transitory medium having the computer program code 917 stored thereon, the computer program code, when executed by the apparatus 900, causes the apparatus 900 at least to perform at least some of the operations, procedures and/or functions described in the foregoing in context of the spatial audio processing arrangements 100, 300, 400a, 400b, 600a, 600b or one or more components thereof. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Reference(s) to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

Although functions have been described with reference to certain features, those functions may be performable by other features whether described or not. Although features have been described with reference to certain embodiments, those features may also be present in other embodiments whether described or not.

The invention claimed is:

1. A method for processing a spatial audio signal that represents an audio scene comprising one or more directional sound components and at least one ambient sound component, wherein the spatial audio signal is controllable and associated with at least two viewing directions, the method comprising:
receiving a focus direction and a focus amount;
processing the spatial audio signal, comprising modifying the audio scene so as to control emphasis in, at least in part, a portion of the spatial audio signal in said focus direction according to said focus amount, wherein controlling emphasis in the portion comprises increasing an amount of at least one directional sound component that is at least partially in the focus direction, of the one or more directional sound components, relative to at least one of:
another directional sound component that is away from the focus direction, or
the at least one ambient sound component; and
outputting the processed spatial audio signal, wherein the modified audio scene enables the emphasis in, at least in part, said portion of the spatial audio signal in said focus direction according to said focus amount.

2. A method according to claim 1, wherein processing the spatial audio signal comprises at least one of:
increasing emphasis in, at least in part, said portion of the spatial audio signal in said focus direction; or
decreasing emphasis in, at least in part, said portion of the spatial audio signal in directions other than said focus direction.

3. A method according to claim 1, wherein processing the spatial audio signal comprises at least one of:

increasing a sound level in, at least in part, said portion of the spatial audio signal in said focus direction according to said focus amount; or decreasing a sound level in, at least in part, said portion of the spatial audio signal in directions other than said focus direction according to said focus amount.

4. A method according to claim 1, wherein the method comprises processing an input spatial audio signal that represents the audio scene into an output spatial audio signal that represents the modified audio scene, the method further comprising receiving reproduction control information to control at least one aspect of outputting the processed spatial audio signal, wherein processing the spatial audio signal comprises processing the input spatial audio signal into an intermediate spatial audio signal that represents the modified audio scene, where a relative level of at least part of sound arriving from said focus direction is modified according to said focus amount; and wherein outputting the processed spatial audio signal comprises processing the intermediate spatial audio signal into the output spatial audio signal in accordance with said reproduction control information.

5. A method according to claim 4, wherein the input spatial audio signal and the intermediate spatial audio signal comprise respective Ambisonic signals and wherein processing the input spatial audio signal into the intermediate spatial audio signal comprises, for one or more frequency sub-bands, the following:

extracting, from the input spatial audio signal, a single-channel target audio signal that represents a sound component arriving from the focus direction;

generating a focused spatial audio signal, comprising arranging the single-channel target audio signal in a spatial position defined with the focus direction; and creating the intermediate spatial audio signal as a linear combination of the focused spatial audio signal and the input spatial audio signal, wherein at least one of the focused spatial audio signal or the input spatial audio signal is scaled with a respective scaling factor derived on basis of the focus amount to increase a relative level of the sound arriving from the focus direction.

6. A method according to claim 5, wherein extracting the single-channel target audio signal comprises:

applying a beamformer to derive, from the input spatial audio signal, a beamformed signal that represents the sound component arriving from the focus direction; and applying a post filter to derive the single-channel target audio signal on basis of the beamformed signal, wherein applying the post filter is configured to cause adjusting of a spectrum of the beamformed signal to match a spectrum of the sound arriving from the focus direction.

7. A method according to claim 5, wherein the input spatial audio signal and the intermediate spatial audio signal comprise respective first order Ambisonic signals.

8. A method according to claim 4, wherein the input spatial audio signal and the intermediate spatial audio signal comprise respective parametric spatial audio signals, wherein a parametric spatial audio signal of the respective parametric spatial audio signals comprises one or more audio channels and spatial metadata, wherein the spatial metadata comprises a respective direction indication and a respective energy ratio parameter for a plurality of frequency sub-bands, wherein processing the input spatial audio signal into the intermediate spatial audio signal comprises the following:

computing, for one or more frequency sub-bands, a respective angular difference between the focus direction and a direction indicated for a respective frequency sub-band of the input spatial audio signal;

deriving a respective gain value for said one or more frequency sub-bands on basis of the respective angular difference computed for the respective frequency sub-band using a predefined function of angular difference and a scaling factor derived on basis of the focus amount;

computing, for one or more frequency sub-bands of the intermediate spatial audio signal, a respective updated directional energy value on basis of an energy ratio parameter of the respective frequency sub-band of the input spatial audio signal and said gain value;

computing, for said one or more frequency sub-bands of the intermediate spatial audio signal, a respective updated ambient energy value on basis of the energy ratio parameter of the respective frequency sub-band of the input spatial audio signal and said scaling factor;

computing a respective modified energy ratio parameter for said one or more frequency sub-bands of the intermediate spatial audio signal on basis of the updated directional energy value divided by a sum of the updated directional energy value and the updated ambient energy value;

computing a respective spectral adjustment factor for the one or more frequency sub-bands of the intermediate spatial audio signal on basis of the sum of the updated directional energy value and the updated ambient energy value; and composing the intermediate spatial audio signal comprising said one or more audio channels of the input spatial audio signal, said direction indications of the input spatial audio signal, said modified energy ratio parameter, and said spectral adjustment factor.

9. A method according to claim 4, wherein the input spatial audio signal and the intermediate spatial audio signal comprise respective parametric spatial audio signals, wherein a parametric spatial audio signal of the respective parametric spatial audio signals comprises one or more audio channels and spatial metadata, wherein the spatial metadata comprises a respective direction indication and a respective energy ratio parameter for a plurality of frequency sub-bands, wherein processing the input spatial audio signal into the intermediate spatial audio signal comprises the following:

computing, for one or more frequency sub-bands, a respective angular difference between the focus direction and a direction indicated for a respective frequency sub-band of the input spatial audio signal;

deriving a respective gain value for said one or more frequency sub-bands on basis of the respective angular difference computed for the respective frequency sub-band using a predefined function of angular difference and a scaling factor derived on basis of the focus amount;

computing, for one or more frequency sub-bands of the intermediate spatial audio signal, a respective updated directional energy value on basis of an energy ratio parameter of the respective frequency sub-band of the input spatial audio signal and said gain value;

computing, for said one or more frequency sub-bands of the intermediate spatial audio signal, a respective updated ambient energy value on basis of the energy ratio parameter of the respective frequency sub-bands of the input spatial audio signal and said scaling factor;

computing a respective modified energy ratio parameter for said one or more frequency sub-bands of the intermediate spatial audio signal on basis of the updated directional energy value divided by a sum of the updated directional energy value and the updated ambient energy value;

computing a respective spectral adjustment factor for the one or more frequency sub-bands of the intermediate spatial audio signal on basis of the sum of the updated directional energy value and the updated ambient energy value;

deriving, in said one or more frequency sub-bands, one or more enhanced audio channels via multiplying the respective frequency band of a respective one of the one more audio channels of the input spatial audio signal by the spectral adjustment factor computed for the respective frequency sub-band; and composing the intermediate spatial audio signal comprising said one or more enhanced audio channels, said direction indications of the input spatial audio signal, and said modified energy ratio parameter.

10. A method according to claim 4, wherein the input spatial audio signal and the intermediate spatial audio signal comprise respective multi-channel loudspeaker signals according to a first predefined loudspeaker configuration, and wherein processing the input spatial audio signal into the intermediate spatial audio signal comprises the following:

computing a respective angular difference between the focus direction and a loudspeaker direction indicated for a respective channel of the input spatial audio signal;

deriving a respective gain value for the respective channel of the input spatial audio signal on basis of the angular difference computed for the respective channel using a predefined function of angular difference and a scaling factor derived on basis of the focus amount;

deriving one or more modified audio channels via multiplying the respective channel of the input spatial audio signal by the gain value derived for the respective channel; and providing said one or more modified audio channels as the intermediate spatial audio signal.

11. A method according to claim 8, wherein said predefined function of angular difference yields a gain value that increases with decreasing value of angular difference and that decreases with increasing value of angular difference.

12. A method according to claim 5, further comprising:

deriving, on basis of the focus amount, a scaling gain having a value between predefined minimum and maximum values such that the scaling gain value increases with increasing value of the focus amount and the scaling value decreases with decreasing value of the focus amount.

13. A method according to claim 4, wherein the intermediate spatial audio signal comprises an Ambisonic signal and the output spatial audio signal comprises a two-channel binaural signal, wherein the reproduction control information comprises an indication of a reproduction orientation that defines a listening direction with respect to the audio scene, and wherein processing the intermediate spatial audio signal into the output spatial audio signal comprises the following:

generating a rotation matrix in dependence of the indicated reproduction orientation;

multiplying channels of the intermediate spatial audio signal with the rotation matrix to derive a rotated spatial audio signal;

filtering channels of the rotated spatial audio signal using a predefined set of finite impulse response filter pairs generated on basis of a data set of head related impulse response functions or head related impulse responses; and generating left and right channels of the two-channel binaural signal as a sum of the filtered channels of the rotated spatial audio signal derived for a respective one of the left and right channels.

14. A method according to claim 8, wherein the output spatial audio signal comprises a two-channel binaural audio signal, wherein the reproduction control information comprises an indication of a reproduction orientation that defines a listening direction with respect to the audio scene, and wherein processing the intermediate spatial audio signal into the output spatial audio signal comprises the following:

deriving, in said one or more frequency sub-bands, one or more enhanced audio channels via multiplying the respective frequency band of a respective one of the one more audio channels of the intermediate spatial audio signal with the spectral adjustment factor for the respective one or more frequency sub-bands; and converting the one or more enhanced audio channels into the two-channel binaural audio signal in accordance with the indicated reproduction orientation.

15. A method according to claim 9, wherein the output spatial audio signal comprises a two-channel binaural audio signal, wherein the reproduction control information comprises an indication of a reproduction orientation that defines a listening direction with respect to the audio scene, and wherein processing the intermediate spatial audio signal into the output spatial audio signal comprises the following:

converting the one or more enhanced audio channels into the two-channel binaural audio signal in accordance with the indicated reproduction orientation.

16. A method according to claim 10, wherein the output spatial audio signal comprises a two-channel binaural signal, wherein the reproduction control information comprises an indication of a reproduction orientation that defines a listening direction with respect to the audio scene, and wherein processing the intermediate spatial audio signal into the output spatial audio signal comprises the following:

selecting a set of head related transfer functions in dependence of the indicated reproduction orientation; and converting channels of the intermediate spatial audio signal into the two-channel binaural signal that conveys a rotated audio scene using the selected set of head related transfer functions.

17. A method according to claim 10, wherein the reproduction control information comprises an indication of a second predefined loudspeaker configuration and the output spatial audio signal comprises multi-channel loudspeaker signals according to said second predefined loudspeaker configuration, and wherein processing the intermediate spatial audio signal into the output spatial audio signal comprises the following:

deriving channels of the output spatial audio signal on basis of channels of the intermediate spatial audio signal using amplitude panning, comprising deriving a conversion matrix including amplitude panning gains that provide a mapping from the first predefined loudspeaker configuration to the second predefined loudspeaker configuration and using the conversion matrix to multiply the channels of the intermediate spatial audio signal into the channels of the output spatial audio signal.

18. A method according to claim 1, comprising:
receiving focus input from a sensor arrangement that comprises at least one motion sensor, wherein the focus input comprises an indication of direction at which an arm of a user is pointing at and an indication of an angle between a forearm and an upper arm of the user;
deriving the focus direction on basis of the direction at which the arm of the user is pointing at; and
deriving the focus amount based on the angle between the forearm and the upper arm of the user.

19. A method according to claim 1, comprising
receiving focus input comprising an indication of viewing direction of a user;
tracking the viewing direction at predefined time intervals;
recording an absolute angular change in the viewing direction between consecutive observations of the viewing direction;
computing a change speed measure on basis of a sum or an average of the absolute angular change in the viewing direction recorded within a predefined time period;
deriving the focus amount on basis of the change speed measure such that the focus amount is increased with decreasing change speed and the focus amount is decreased with increasing change speed; and
deriving the focus direction based on a current viewing direction.

20. An apparatus for processing a spatial audio signal that represents an audio scene comprising one or more directional sound components and at least one ambient sound component, wherein the spatial audio signal is controllable and associated with at least two viewing directions,
the apparatus comprising at least one processor and at least one non-transitory memory including computer program code, which, when executed with the at least one processor, causes the apparatus to:
receive a focus direction and a focus amount;
process the spatial audio signal, comprising modifying the audio scene so as to control emphasis in, at least in part, a portion of the spatial audio signal in said focus direction according to said focus amount, wherein controlling emphasis in the portion comprises increasing an amount of at least one directional sound component that is at least partially in the focus direction, of the one or more directional sound components, relative to at least one of:
another directional sound component that is away from the focus direction, or
the at least one ambient sound component; and
output the processed spatial audio signal, wherein the modified audio scene enables the emphasis in, at least in part, said portion of the spatial audio signal in said focus direction according to said focus amount.

* * * * *